US008098322B2

(12) United States Patent
Katsuda et al.

(10) Patent No.: US 8,098,322 B2
(45) Date of Patent: Jan. 17, 2012

(54) IMAGE PICKUP DEVICE AND IMAGE PICKUP APPARATUS

(75) Inventors: Yasutoshi Katsuda, Osaka (JP); Shinichi Fujii, Osaka (JP); Genta Yagyu, Hyogo (JP)

(73) Assignee: Sony Corporation (JP)

( * ) Notice: Subject to any disclaimer, the term of this patent is extended or adjusted under 35 U.S.C. 154(b) by 529 days.

(21) Appl. No.: 12/378,046

(22) Filed: Feb. 9, 2009

(65) Prior Publication Data

US 2009/0225217 A1 Sep. 10, 2009

(30) Foreign Application Priority Data

Feb. 12, 2008 (JP) ................................ 2008-030398

(51) Int. Cl.
*G03B 13/36* (2006.01)

(52) U.S. Cl. ........................................ 348/350; 396/113

(58) Field of Classification Search .................. 348/349, 348/350; 396/111, 113, 114; 250/201.8; 356/3.13

See application file for complete search history.

(56) References Cited

U.S. PATENT DOCUMENTS 6,829,008 B1 * 12/2004 Kondo et al. ................ 348/302
7,863,550 B2 * 1/2011 Kusaka ...................... 250/201.8

FOREIGN PATENT DOCUMENTS

JP 2000-156823 A 6/2000

* cited by examiner

*Primary Examiner* — William B. Perkey
(74) *Attorney, Agent, or Firm* — Lerner, David, Littenberg, Krumholz & Mentlik, LLP

(57) ABSTRACT

An image pickup device includes a group of photoelectric conversion cells that output distance-measurement signals for phase difference detection. Each photoelectric conversion cell includes a photodetector and a pupil restricting unit. The photodetector generates the distance-measurement signal. The pupil restricting unit restricts a size of a pupil area, from which arrival light has exited, to a predetermined size in an exit pupil of a taking optical system, object light exiting from the exit pupil of the taking optical system, the arrival light arriving at the photodetector. The predetermined size is less than half a size of an entire area of the exit pupil.

8 Claims, 14 Drawing Sheets

IMAGE PICKUP DEVICE AND IMAGE PICKUP APPARATUS

CROSS REFERENCES TO RELATED APPLICATIONS

The present application claims priority from Japanese Patent Application No. JP 2008-030398, filed in the Japanese Patent Office on Feb. 12, 2008, the entire content of which is incorporated herein by reference.

BACKGROUND OF THE INVENTION

1. Field of the Invention

The present invention relates to an image pickup device and a technology related thereto.

2. Description of the Related Art

A technology in which a distance-measurement signal, used for detecting a focus in a phase-difference detection method, is obtained from a photoelectric conversion cell incorporated in an image pickup device (solid-state image pickup device) is provided.

For example, in an image pickup device discussed in Japanese Unexamined Patent Application Publication No. 2000-156823, a plurality of photoelectric conversion cells, each including a photodetector and a micro-lens disposed at an incident-side of the photodetector, are provided. The plurality of photoelectric conversion cells include the photoelectric conversion cells for image pickup and the photoelectric conversion cells for phase-difference detection, with each type of photoelectric conversion cells being disposed in the same plane.

Two types of photoelectric conversion cells for phase-difference detection, that is, a pair thereof capable of dividing an exit pupil, is available. The two types of photoelectric conversion cells are such that pixel outputs regarding an object image that have passed through different pupil areas are obtained from the two types of photoelectric conversion cells, respectively.

In addition, in measuring distance, the two pixel outputs obtained from the respective two types of photoelectric conversion cells are compared with each other to detect a focus.

SUMMARY OF THE INVENTION

However, in the technology discussed in Japanese Unexamined Patent Application Publication No. 2000-156823, when, in measuring distance, an image formed in an image pickup plane of the image pickup device is considerably blurred, that is, when a defocus amount is large, the difference between the pixel outputs of the respective photoelectric conversion cells for phase-difference detection becomes small. In such a case, since the number of characteristic portions of the image outputs is reduced, it is difficult to detect a focus by comparing the two pixel outputs with each other.

Accordingly, it is desirable to provide a technology which can increase the feasibility of detecting a focus using photoelectric conversion cells used for phase-difference detection and incorporated in an image pickup device.

According to an embodiment of the present invention, there is provided an image pickup device including a group of photoelectric conversion cells that output distance-measurement signals for phase difference detection, wherein each photoelectric conversion cell includes a photodetector and pupil restricting means, wherein the photodetector generates the distance-measurement signal, wherein the pupil restricting means restricts a size of a pupil area, from which arrival light has exited, to a predetermined size in an exit pupil of a taking optical system, object light exiting from the exit pupil of the taking optical system, the arrival light arriving at the photodetector, and wherein the predetermined size is less than half a size of an entire area of the exit pupil.

According to another embodiment of the present invention, there is provided an image pickup apparatus including an image pickup device including a photoelectric conversion cell that outputs a distance-measurement signal for phase difference detection, and focus detecting means for detecting a focus on the basis of the distance-measurement signal, wherein the photoelectric conversion cell includes a photodetector and pupil restricting means, wherein the photodetector generates the distance-measurement signal, wherein the pupil restricting means restricts a size of a pupil area, from which arrival light has exited, to a predetermined size in an exit pupil of a taking optical system, object light exiting from the exit pupil of the taking optical system, the arrival light arriving at the photodetector, and wherein the predetermined size is less than half a size of an entire area of the exit pupil.

According to the embodiments of the present invention, in each of the photoelectric conversion cells that outputs a distance-measurement signal for phase-difference detection, the size of the pupil area, which causes arrival light, which arrives at the photodetector, to exit therefrom, is limited to a size that is less than half the size of the entire exit pupil area. Therefore, the degree of blur of an object image formed on the image pickup device is reduced, so that it is possible to increase the feasibility of detecting a focus using each of the photoelectric conversion cells used for phase-difference detection and incorporated in the image pickup device.

DESCRIPTION OF THE PREFERRED EMBODIMENTS

Embodiments

External Structure of Image Pickup Device 1

Figure 1:
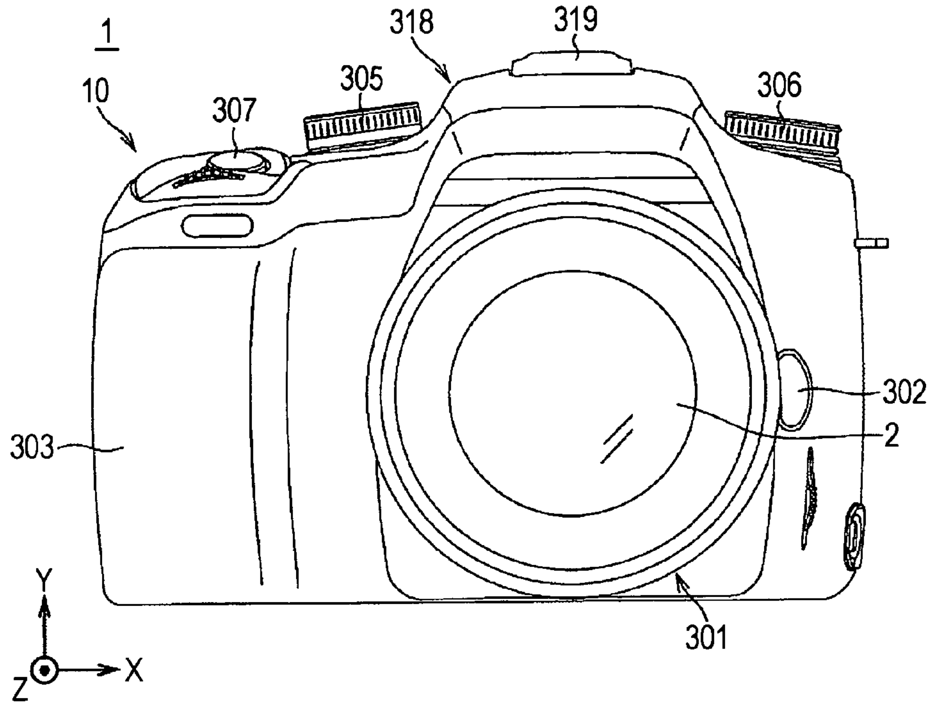
FIG. 1 shows an external structure of an image pickup apparatus according to an embodiment of the present invention.
Figure 2:
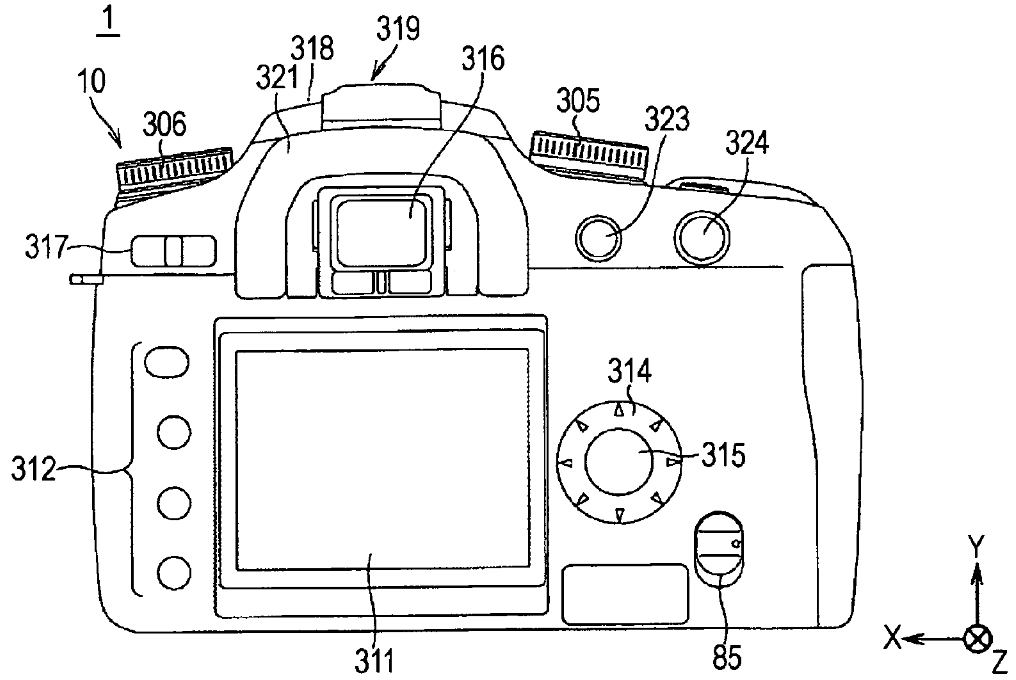
FIG. 2 shows an external structure of the image pickup apparatus according to the embodiment of the present invention.

FIGS. 1 and 2 each show an external structure of an image pickup apparatus 1 according to an embodiment of the present invention. Here, FIGS. 1 and 2 are, respectively, a front view and a rear view thereof.

The image pickup apparatus 1 is formed as, for example, a digital still camera of a single-lens reflex type, and includes a camera body 10 and an interchangeable lens 2 removably provided at the camera body 10 as a taking lens.

More specifically, as shown in FIG. 1, the front side of the camera body 10 is provided with a mount section 301, a lens-interchanging button 302, a grip section 303, a mode setting dial 305, a control-value setting dial 306, and a shutter button (release button) 307. The interchangeable lens 2 is mounted to substantially the center of the front surface of the mount section 301. The lens-interchanging button 302 is disposed on the right side of the mount section 301. The grip section 303 is provided for allowing gripping. The mode setting dial 305 is disposed at the upper left portion of the front side. The control-value setting dial 306 is disposed at the upper right portion of the front side. The shutter button (release button) 307 is disposed at the upper surface of the grip section 303.

The interchangeable lens 2 functions as a lens window that takes in light (object light) from an object and as a taking optical system for guiding the object light to an image pickup device 101 disposed in the camera body 10.

Figure 5:
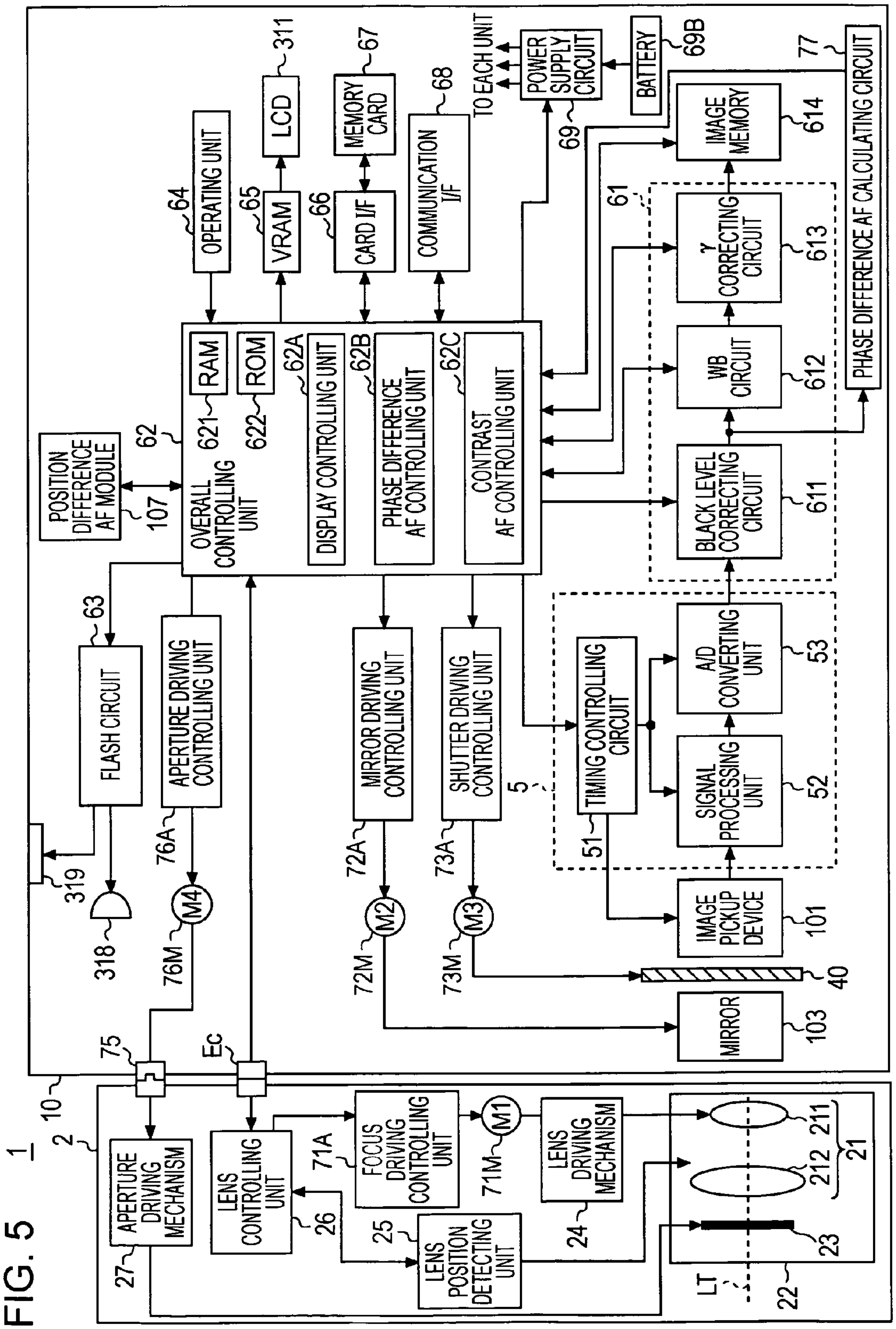
FIG. 5 is a block diagram of an electrical structure of the image pickup apparatus.

More specifically, the interchangeable lens 2 includes a lens group 21 having a plurality of lenses disposed in parallel along a light axis LT (see FIG. 5). The lens group 21 includes a focus lens 211 (FIG. 5) for adjusting a focus and a zoom lens 212 (FIG. 5) for changing magnification. By driving these lenses in the direction of the light axis LT, the focus is adjusted or the magnification is changed. The interchangeable lens 2 is provided with an operation ring at a suitable location of the outer periphery of its barrel so as to be rotatable along the outer peripheral surface of the barrel. When the zoom lens 212 is manually or automatically operated, the zoom lens 212 moves in the direction of the light axis LT in accordance with the direction and amount of rotation of the operation ring, to set a zoom magnification (taking magnification) in accordance with the position to which the zoom lens 212 is to be moved.

The mount section 301 includes a connector Ec (see FIG. 5) and a coupler 75 (FIG. 5), which are used for electrical connection and for mechanical connection with the mounted interchangeable lens 2, respectively.

The lens interchanging button 302 is a button that is pressed when removing the interchangeable lens 2 mounted to the mount section 301.

The grip section 303 is a portion of the image pickup apparatus 1 that a photographer (user) grips when taking photographs. The surface of the grip section 303 is provided with recesses and protrusions in accordance with the shapes of the fingers for enhancing fittability. A battery chamber and a card chamber (not shown) are provided in the grip section 303. The battery chamber accommodates a battery 69B (see FIG. 5) serving as a power supply of the image pickup apparatus 1, and the card chamber removably accommodates a memory card 67 (FIG. 5) for recording image data of a photographed image. The grip section 303 may be provided with a grip sensor for detecting whether or not the user has gripped the grip section 303.

The mode setting dial 305 and the control-value setting dial 306 are substantially disc-shaped members that are rotatable in a plane that is substantially parallel to the upper surface of the camera body 10. The mode setting dial 305 is provided for selecting various modes provided at the image pickup apparatus 1 (such as various taking modes (person taking mode, scenery taking mode, full-auto taking mode), a reproduction mode in which a photographed image is reproduced, and a communication mode for exchanging data with an external apparatus). The control-value setting dial 306 is provided for setting control values for various functions of the image pickup apparatus 1.

The shutter button 307 is a press switch that can detect whether it is in a "partially pressed state" or in a "fully pressed state" resulting from further pressing the shutter button 307. In the taking mode, when the shutter button 307 is partially pressed (S1), a preparation operation (such as setting an exposure control value and detecting a focus) for photographing a still image of an object is executed; and, when the shutter button 307 is fully pressed (S2), taking operations (a series of operations in which the image pickup device 101 (see FIG. 4) is exposed, a predetermined image processing operation is performed on an image signal obtained by the exposure, and the resulting image signal is recorded onto, for example, the memory card 67) are executed.

As shown in FIG. 2, the rear surface side of the camera body 10 is provided with an LCD (Liquid Crystal Display) 311, a finder window 316, an eye cup 321, a main switch 317, an exposure correction button 323, an AE lock button 324, a flash section 318, and a connection terminal section 319. The LCD 311 functions as a display section. The finder window 316 is disposed above the LCD 311. The eye cup 321 surrounds the finder window 316. The main switch 317 is disposed on the left of the finder window 316. The exposure correction button 323 and the AE lock button 324 are disposed on the right of the finder window 316. The flash section 318 and the connection terminal section 319 are disposed above the finder window 316. The rear surface side of the camera body 10 is also provided with a setting button group 312, a direction selection key 314, a pushbutton 315, and a display change-over switch 85. The setting button group 312 is disposed on the left of the LCD 311. The direction selection key 314 is disposed on the right of the LCD 311. The pushbutton 315 is disposed at the center of the direction selection key 314. The display change-over switch 85 is disposed on the lower right side of the direction selection key 314.

The LCD 311 includes a color liquid crystal panel that can display an image. The LCD 311 displays an image picked up by the image pickup device 101 (see FIG. 3), reproduces and displays a recorded image, etc. In addition, the LCD 311 provides a setting screen of a mode or function of the image pickup apparatus 1. Instead of the LCD 311, an organic EL display device or a plasma display device may be used.

The finder window (eyepiece window) 316 is formed of an optical finder (OVF), with light (object light), transmitted through the interchangeable lens 2 and forming an object image, being guided to the finder window 316. When the user looks through the finder window 316, the object image that is actually photographed by the image pickup device 101 can be seen.

The main switch 317 is a slide switch having two contacts and sliding towards the left and right. When its left side is set, the power supply of the image pickup apparatus 1 is turned on, whereas, when its right side is set, the power supply is turned off.

The flash section 318 is formed as a pop-up-type built-in flash. When, for example, an external flash section is mounted to the camera body 10, the connection terminal section 319 is used for connection.

The eye cup 321 functions as a light-shielding member that restricts entrance of external light into the finder window 316.

The exposure correction button 323 is a button for manually adjusting exposure values (aperture value and shutter speed), and the AE lock button 324 is a button for fixing the exposure.

The setting button group 312 includes buttons for controlling the various functions of the image pickup apparatus 1. The setting button group 312 includes, for example, a menu button, which causes a menu screen to be provided at the LCD 311, and a menu switching button, which switches the content of the menu screen.

The direction selection key 314 is an annular member including a plurality of pressing sections (triangular portions in the figure) disposed at a certain interval in a circumferential direction, and is formed so that the pressing operations of the pressing sections are detected by contacts (switches) (not shown) provided in accordance with the pressing sections. The pushbutton 315 is disposed at the center of the direction selection key 314. The direction selection key 314 and the pushbutton 315 are provided for inputting commands of, for example, changing taking magnification (moving the zoom lens 212 (see FIG. 5) in a wide-angle direction or a telephoto-end direction), performing frame-by-frame advance of a recorded image reproduced on, for example, the LCD 311, and setting a taking condition (such as a aperture value, shutter speed, whether or not there is flash emission).

The display change-over switch 85 is a slide switch having two contacts. When the contact is set to "optical position" at an upper side, an optical finder mode (also called "OVF mode") is selected, to display an object image in the field of view of the optical finder. This makes it possible for the user to view the object image displayed in the field of view of the optical finder through the finder window 316, to perform a frame determining operation (framing).

In contrast, when the contact of the display change-over switch 85 is set to "monitor" position at a lower side, an electronic finder mode (also called "EVF mode" or "live view mode") is selected, so that, on the LCD 311, a live view image regarding the object image is displayed in an animated mode. This makes it possible for the user to view the live-view image displayed on the LCD 311, to perform framing.

In this way, by operating the display change-over switch 85, the user can switch the finder mode. In the image pickup apparatus 1, it is possible to perform framing of the object using the optical finder or an electronic finder for performing a live-view display.

<Internal Structure of Image Pickup Apparatus 1>

Figure 3:
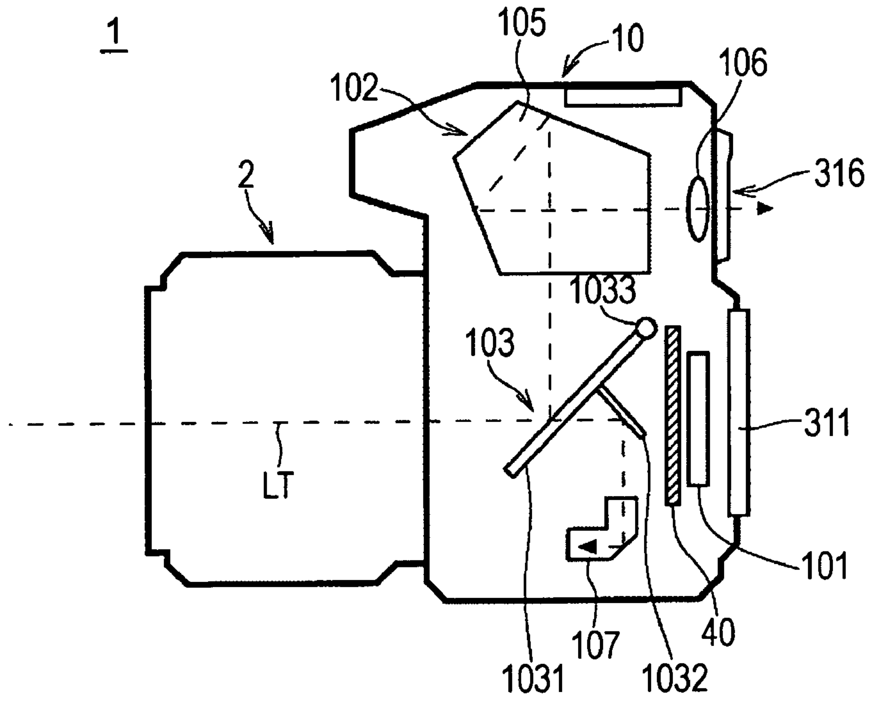
FIG. 3 is a vertical sectional view of the image pickup apparatus.
Figure 4:
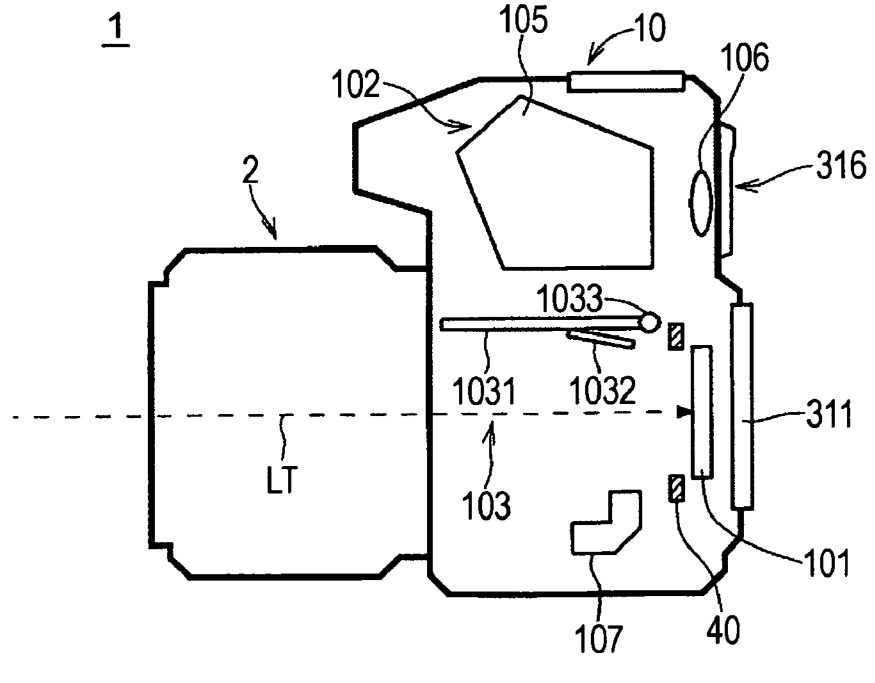
FIG. 4 is a vertical sectional view of the image pickup apparatus.

Next, the internal structure of the image pickup apparatus 1 will be described. FIGS. 3 and 4 are vertical sectional views of the image pickup apparatus 1. As shown in FIG. 3, the image pickup device 101, a finder section 102 (finder optical system), a mirror 103, a phase-difference AF module 107 (may also be referred to as simply "AF module") etc., are provided in the camera body 10.

On the light axis LT of the interchangeable lens 2 when the interchangeable lens 2 is mounted to the camera body 10, the image pickup device 101 is disposed perpendicular to the light axis LT. As the image pickup device 101, a CMOS color area sensor (CMOS image pickup device) in which, for example, a plurality of pixels formed of photodiodes are disposed two-dimensionally in a matrix is used. The image pickup device 101 generates analog electrical signals (image signals) of respective color components, R (red), G (green) and B (blue), regarding an object image that has been focused by being transmitted through the interchangeable lens 2; and outputs them as image signals of the respective colors R, G, and B.

The image pickup device 101 has pixels for detecting a phase difference in an image pickup plane 101*f*. The details will be described later.

The mirror 103 is disposed on the aforementioned light axis LT so as to be positioned where object light is reflected towards the finder section 102. The object light that has passed through the interchangeable lens 2 is reflected upward by the mirror 103 (a main mirror 1031 described later), and a portion of the object light passes through the mirror 103.

The finder section 102 includes a pentaprism 105, an eyepiece 106, and a finder window 316. The pentaprism 105 is a pentagonal prism in cross section and is used for forming an erect image by reversing the top and bottom and the left and right side of a light image as a result of internal reflection of the object image incident upon the pentaprism 105 from the lower surface thereof. The eyepiece 106 guides the object image formed into an erect image by the pentaprism 105 to the outer side of the finder window 316. By such a structure, the finder section 102 functions as an optical finder for confirming a depth of field during a taking standby state prior to actually taking photographs.

The mirror 103 includes the main mirror 1031 and a sub-mirror 1032. At the back side of the main mirror 1031, the sub-mirror 1032 is rotatably provided so as to be tilted towards the back surface of the main mirror 1031. A portion of the object light that has passed through the main mirror 1031 is reflected by the sub-mirror 1032, and the reflected object light is incident upon an AF module 107.

The mirror 103 is formed as what is called a quick return mirror. For example, during exposure (actual taking operation) (refer to FIG. 4), the mirror 103 is directed and flipped upward with a rotational shaft 1033 as a fulcrum, so that the mirror 103 is set in a state in which it is withdrawn from a light path of the object light (a mirror-upward state). Here, when the mirror 103 is stopped below the pentaprism 105, the sub-mirror 1032 is folded so as to be substantially parallel to the main mirror 1031. By this, the object light from the interchangeable lens 2 reaches the image pickup device 101 without being intercepted by the mirror 103, and is used to expose the image pickup device 101. When the image pickup operation at the image pickup device 101 is completed, the mirror 103 is restored to its original position (position shown in FIG. 3), and is in a mirror-downward state.

When the mirror 103 is in the mirror-upward state prior to an actual taking operation (taking operation for recording an image), the image pickup apparatus 1 makes possible a live-view (preview) display for displaying an object on the LCD 311 in an animated state on the basis of image signals that are sequentially generated by the image pickup device 101.

The AF module 107 is formed as what is called an AF sensor, such as a line sensor that detects focus information of an object. The AF module 107 is disposed at the bottom portion of the mirror 103, and has a phase-difference detection function for generating a phase-difference detection signal in accordance with the degree of focus of an object image. That is, when the user confirms the object through the finder window 316 during a taking standby state, as shown in FIG. 3, the object light is guided to the AF module 107 while the main mirror 1031 and the sub-mirror 1032 are set downward, and a phase-difference detection signal is output from the AF module 107.

The shutter unit 40 is disposed at an image pickup surface side of the image pickup device 101. The shutter unit 40 includes a curtain member that moves vertically, and is formed as a mechanical focal plane shutter that opens a light path of object light guided to the image pickup device 101 along the light axis LT and that closes the light path of the object light. The shutter unit 40 may be omitted when the image pickup device 101 is an image pickup device that can function as a complete electronic shutter.

<Electrical Structure of Image Pickup Device 1>

FIG. 5 is a block diagram of the electrical structure of the image pickup apparatus 1. Here, members, etc., similar to those in FIGS. 1 to 4 are given the same reference numerals. For the sake of explanation, the electrical structure of the interchangeable lens 2 will be described first.

In addition to the lens group 21 of the aforementioned taking optical system, the interchangeable lens 2 includes a lens driving mechanism 24, a lens position detecting unit 25, a lens controlling unit 26, and an aperture driving mechanism 27.

In the lens group 21, a focus lens 211 and a zoom lens 212 and an aperture 23 for adjusting the quantity of light incident upon the image pickup device 101 are held in the direction of the light axis LT in the barrel. Object light taken in by the lens group 21 is focused on the image pickup device 101. In automatic focus (AF) control, the focus lens 211 is driven in the direction of the light axis LT by an AF actuator 71M in the interchangeable lens 2, to perform a focusing operation.

On the basis of an AF control signal applied from an overall controlling unit 62 through the lens controlling unit 26, a focus driving controlling unit 71A generates a driving control signal for moving the focus lens 211 to an in-focus position, to control the AF actuator 71M using the driving control signal. The AF actuator 71M includes, for example, a stepping motor, and applies a lens driving force to the lens driving mechanism 24.

The lens driving mechanism 24 is formed of, for example, a helicoid and a gear (not shown) that rotates the helicoid. The lens driving mechanism 24 receives driving force from the AF actuator 71M, to drive, for example, the focus lens 211 in a direction parallel to the light axis LT. The direction and amount of movement of the focus lens 211 are in accordance with the direction of rotation and the number of rotations of the AF actuator 71M, respectively.

The lens position detecting unit 25 includes an encode plate, which is formed of a plurality of code patterns that are formed at a predetermined pitch in the direction of the light axis LT within a range of movement of the lens group 21, and an encoder brush, which moves together with a lens while slidably contacting the encode plate. The lens position detecting unit 25 detects the amount of movement when focusing the lens group 21. A lens position detected by the lens position detecting unit 25 is, for example, output as a number of pulses.

The lens controlling unit 26 includes a microcomputer in which a memory, such as ROM or a flash memory, is incorporated, with ROM storing a control program and the flash memory storing state data.

The lens controlling unit 26 has a communications function for performing communication between it and the overall controlling unit 62 of the camera body 10 through the connector Ec. By this, for example, state information data, such as periphery light quantity, the in-focus distance, the aperture value, or the focal length of the lens group 21; and position information of the focus lens 211 detected by the lens position detecting unit 25 are transmitted to the overall controlling unit 62, so that, for example, data concerning driving amount of the focus lens 211 can be received from the overall controlling unit 62.

The aperture driving mechanism 27 receives driving force from an aperture driving actuator 76M through the coupler 75, to change the aperture diameter of the aperture 23.

Next, an electrical structure of the camera body 10 will be described. In addition to the image pickup device 101, the shutter unit 40, etc., the camera body 10 includes an AFE (analog front end) 5, an image processing unit 61, an image memory 614, the overall controlling unit 62, a flash circuit 63, an operating unit 64, VRAM 65, a card I/F 66, the memory card 67, a communications I/F 68, a power supply circuit 69, the battery 69B, a mirror driving controlling unit 72A, a shutter driving controlling unit 73A, and an aperture driving controlling unit 76A.

As mentioned above, the image pickup device 101 includes the CMOS color area sensor. By a timing controlling circuit 51 described later, image pickup operations, such as starting (ending) an exposure operation of the image pickup device 101, selecting outputs of the respective pixels of the image pickup device 101, and reading out a pixel signal, are controlled.

The AFE 5 applies a timing pulse that causes the image pickup device 101 to perform a predetermined operation, performs a predetermined signal operation on an image signal output from the image pickup device 101, converts the processed image signal into a digital signal, and outputs the digital signal to the image processing unit 61. The AFE 5 includes, for example, the timing controlling circuit 51, a signal processing unit 52 and an A/D converting unit 53.

On the basis of a reference clock output from the overall controlling unit 62, the timing controlling circuit 51 generates predetermined timing pulses (a vertical scanning pulse $\phi$Vn, a horizontal scanning pulse $\phi$Vm, a reset signal $\phi$Vr, etc.), and outputs them to the image pickup device 101, to control the image pickup operations of the image pickup device 101. By outputting the predetermined timing pulses to the signal processing unit 52 and to the A/D converting unit 53, the operations of the signal processing unit 52 and the A/D converting unit 53 are controlled.

The signal processing unit 52 performs a predetermined analog signal processing operation on an analog image signal output from the image pickup device 101. The signal processing unit 52 is provided with, for example, a CDS (Correlated Double Sampling) circuit, an AGC (Automatic Gain Control) circuit, and a clamp circuit. On the basis of the timing pulses output from the timing controlling circuit 51, the A/D converting unit 53 converts analog R, G, and B image signals output from the signal processing unit 52 into digital image signals formed of a plurality of bits (such as 12 bits).

The image processing unit 61 forms an image file by performing a predetermined signal operation on image data output from the AFE 5, and includes, for example, a black level correcting circuit 611, a white balance controlling circuit 612, and a gamma correcting circuit 613. The image data taken in by the image processing unit 61 is written once to the image memory 614 in synchronism with the reading out of the image pickup device 101. Thereafter, the image data written to the image memory 614 is accessed to perform a processing operation in each block of the image processing unit 61.

The black level correcting circuit 611 corrects a black level of each of the R, G, and B digital image signals subjected to the A/D conversion operation by the A/D converting unit 53.

On the basis of a white reference according to a light source, the white balance controlling circuit 612 performs level conversion (white balance (WB) adjustment) on the digital signals of the R (red), G (green), and B (blue) color components. More specifically, on the basis of WB adjustment data provided from the overall controlling unit 62, the white balance controlling circuit 612 specifies a portion that is presumed to be actually white in a photographed object from, for example, luminance or chroma data. The average of the R, G, and B color components of this portion and a G/R ratio and a G/B ratio are determined, to subject this portion to level correction as correction gain of R and B.

The gamma correcting circuit 613 corrects the gradation characteristics of the image data subjected to the WB adjustment. More specifically, using a previously set gamma correction table, the gamma correcting circuit 613 performs non-linear transformation and offset adjustment on the level of the image data in accordance with the color components.

In the taking mode, the image memory 614 is a memory used as a working area for temporarily storing the image data output from the image processing unit 61, and for performing a predetermined processing operation on the image data by the overall controlling unit 62. In the reproduction mode, the image memory 614 temporarily stores the image data read out from the memory card 67.

The overall controlling unit 62 is formed as a microcomputer, and primarily includes, for example, a CPU, RAM 621, and ROM 622. The overall controlling unit 62 reads out a program stored in ROM 622, and the program is executed by the CPU to realize various functions of the image pickup apparatus 1.

The overall controlling unit 62 functionally realizes a display controlling unit 62A, a phase difference AF controlling unit 62B, and a contrast AF controlling unit 62C by executing the program.

The display controlling unit 62A controls the content of the display of the LCD 311. For example, the display controlling unit 62A successively displays a plurality of images, continuously obtained by the image pickup device 101, as live-view images.

The display controlling unit 62A combines areas Ef (also called "AF areas", "distance-measurement areas," or "focus areas") (see FIG. 6), where focal information is obtained by an AF operation, into live-view images to superimpose them upon each other for display.

The phase difference AF controlling unit 62B executes an automatic focusing operation in which the in-focus position is detected by a phase difference detection method. More specifically, on the basis of the phase difference detection signal obtained by the AF module 107 or an output signal from a phase difference AF calculating circuit 77 (described later), the phase difference AF controlling unit 62B performs a focusing lens position specifying operation in which a taking lens (more specifically, the focus lens) position during an in-focus state (more specifically, a focusing lens position) is specified.

The contrast AF controlling unit 62C executes an automatic focusing operation (also called "contrast AF operation") in which the in-focus position is detected by a contrast detection method. More specifically, the contrast AF controlling unit 62C executes an evaluation value calculation operation and a focusing lens position specifying operation. In the evaluation value calculation operation, evaluation values according to contrast of an object image are obtained for a plurality of photographed images obtained at different lens positions, respectively. In the focusing lens position specifying operation, lens positions where the evaluation values are optimized (for example, minimized) are specified as focusing lens positions.

In a flash taking mode, the flash circuit 63 controls a light-emission amount of an external flash, connected to the flash section 318 or the connection terminal section 319, to a light-emission amount set by the overall controlling unit 62.

The operating unit 64 includes the aforementioned mode setting dial 305, the control-value setting dial 306, the shutter button 307, the setting button group 312, the direction selection key 314, the pushbutton 315, the main switch 317, etc. The operating unit 64 is used for inputting operation information to the overall controlling unit 62.

VRAM 65 is a buffer memory having a storage capacity of an image signal in accordance with the number of pixels of the LCD 311 and is disposed between the overall controlling unit 62 and the LCD 311. The card I/F 66 is an interface for allowing exchange of a signal between the memory card 67 and the overall controlling unit 62. The memory card 67 is a recording medium that stores image data generated by the overall controlling unit 62. The communications I/F 68 is an interface for allowing transmission of, for example, image data to a personal computer or to another external apparatus.

The power supply circuit 69 is, for example, a constant-voltage circuit, and generates a voltage for driving the entire image pickup apparatus 1, such as a controlling section of, for example, the overall controlling unit 62, the image pickup device 101, and various other driving sections. Control of electrification to the image pickup device 101 is carried out on the basis of a control signal applied to the power supply circuit 69 from the overall controlling unit 62. The battery 69B is a power supply which includes a primary battery, such as an alkaline battery, or a secondary battery, such as a nickel metal hydride battery, and which supplies electrical power to the entire image pickup apparatus 1.

A mirror driving actuator 72A is an actuator that, in accordance with finder mode switching or a taking operation timing, generates a driving signal that drives a mirror driving actuator 72M. The mirror driving actuator 72M is an actuator that rotates the mirror 103 (quick return mirror) to a horizontal posture or a tilted posture.

On the basis of a control signal applied from the overall controlling unit 62, the shutter driving controlling unit 73A generates a driving control signal to a shutter driving actuator 73M. The shutter driving actuator 73M performs an opening/closing driving operation of the shutter unit 40.

On the basis of a control signal applied from the overall controlling unit 62, the aperture driving controlling unit 76A generates a driving control signal to the aperture driving actuator 76M. The aperture driving actuator 76M applies a driving force to the aperture driving mechanism 27 through the coupler 75.

The camera body 10 includes the phase difference AF calculating circuit 77 which performs necessary calculations when performing autofocus (AF) control, on the basis of image data subjected to black level correction and output from the black level correcting circuit 611.

A focusing detection operation in a phase difference detection method using an output signal from the phase difference AF calculating circuit 77 will hereunder be described in more detail.

<Phase Difference AF By Image Pickup Device 101>

Figure 6:
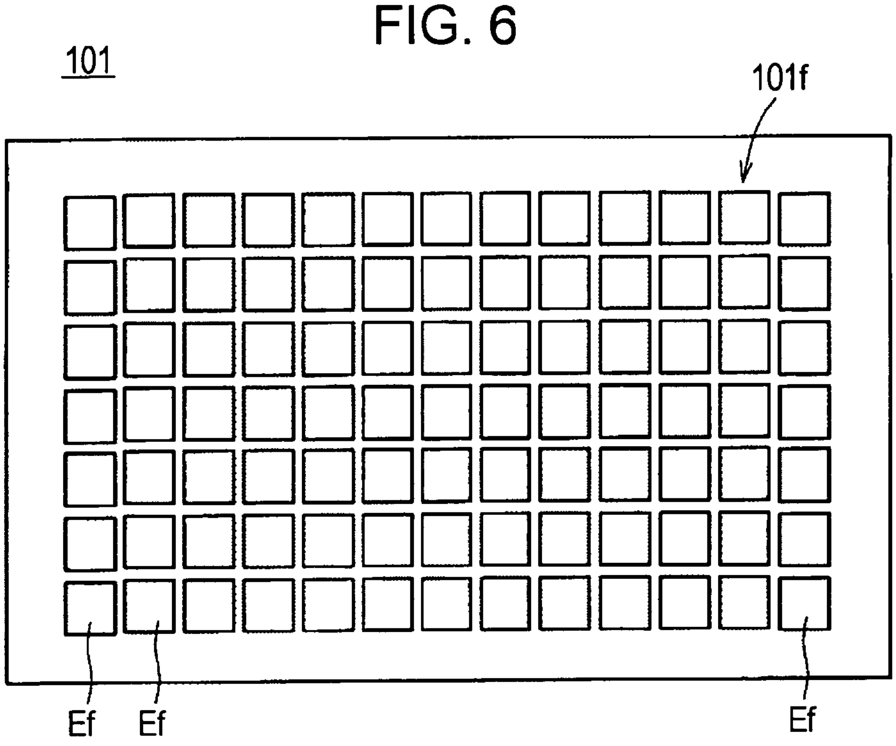
FIG. 6 illustrates a structure of an image pickup device.
Figure 7:
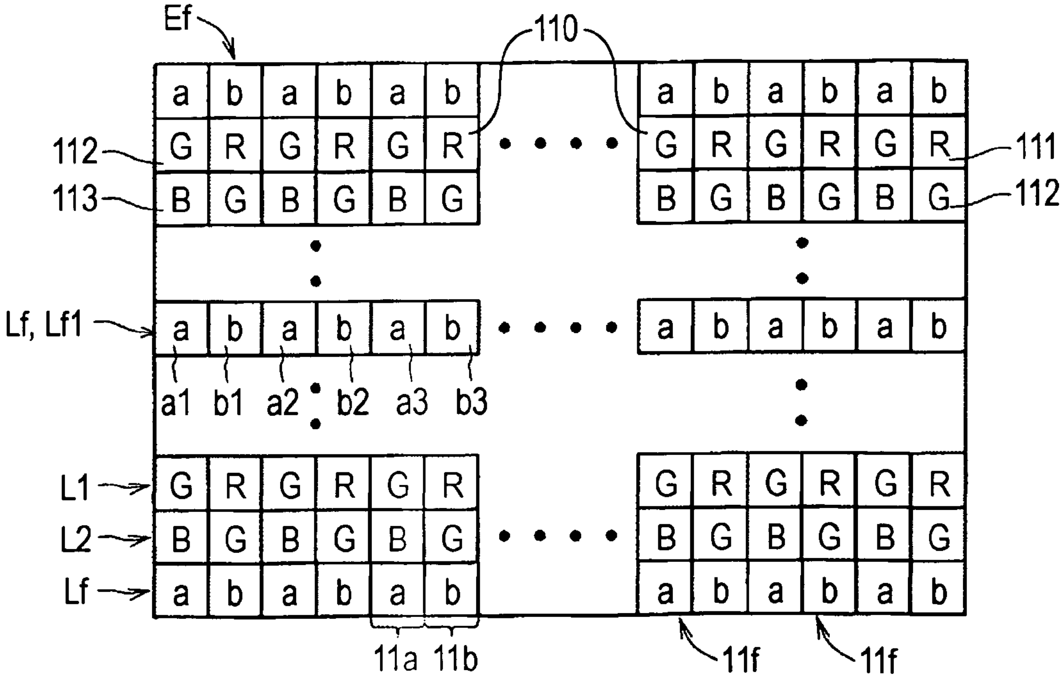
FIG. 7 illustrates a structure of the image pickup device.
Figure 8:
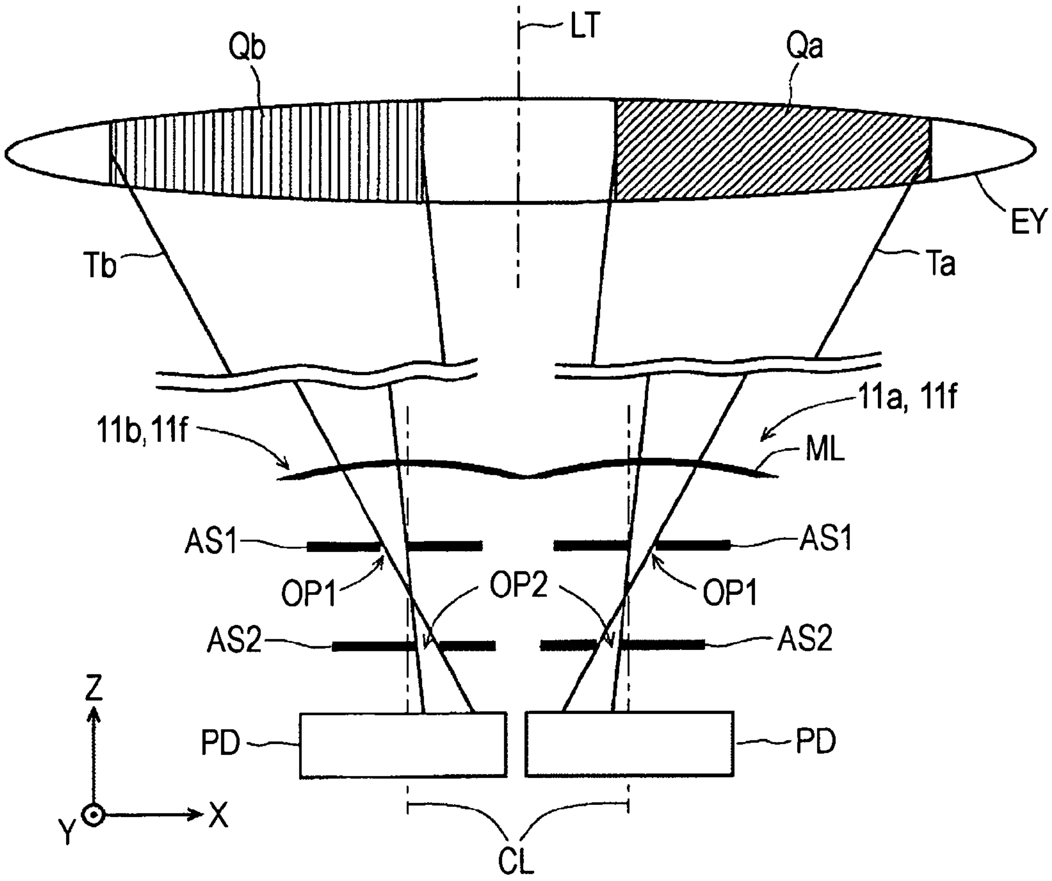
FIG. 8 is a vertical sectional view of a pair of AF pixels.

In the image pickup apparatus 1, light (object light), which has exited from (which has passed through) areas having different portions (may also hereunder be referred to as "partial pupil areas") of an exit pupil EY in the interchangeable lens 2 (exit pupil EY of the taking optical system), is received by the image pickup device 101, to make it possible to detect a focus by the phase difference detection method. First, the structure of the image pickup device 101 and the principle of detecting the focus using the image pickup device 101 will hereunder be described. FIGS. 6 and 7 each illustrate the structure of the image pickup device 101. FIG. 8 is a vertical sectional view of pixels 11*f* for performing phase difference AF (may also hereunder be referred to as "AF pixels" or "photoelectric conversion cells").

As shown in FIG. 6, the image pickup device 101 has the AF areas Ef prescribed to be disposed in a matrix in the image pickup plane 10*f*.

As shown in FIG. 7, each AF area Ef is provided with ordinary pixels 110 (may also hereunder be referred to as "normal pixels" or "image pickup pixels") and the pixels (AF pixels) 11*f* for performing phase difference AF. The ordinary pixels 110 include R pixels 111, G pixels 112, and B pixels 113, where color filters for R (red), G (green), and B (blue) are disposed on photodiodes.

At the AF areas Ef, Gr lines L1 and Gb lines L2 are formed. In each Gr line L1 serving as an ordinary pixel horizontal line, the G pixels 112 and the R pixels 111 are alternately disposed horizontally. In each Gb line L2 serving as an ordinary pixel horizontal line, the B pixels 113 and the G pixels 112 are alternately disposed horizontally. A Bayer arrangement is formed by alternately disposing the Gr lines L1 and the Gb lines L2 vertically.

Each AF area Ef is provided with, for example, AF lines Lf in which the AF pixels 11*f* are disposed horizontally for every six horizontal lines of the aforementioned ordinary pixels. Each AF area Ef may be provided with, for example, approximately 20 AF lines Lf.

Each AF line Lf has a plurality of pairs of AF pixels 11*a* and 11*b* that divide the exit pupil EY of the taking optical system and that receives object light. More specifically, as shown in FIG. 8, in each AF line Lf, the pairs of AF pixels 11*a* and 11*b* are disposed horizontally. Each pair of AF pixels 11*a* and 11*b* receives a light beam Ta from a right portion Qa (may also be called "right partial pupil area" or simply "right pupil area") of the exit pupil EY of the taking optical system and a light beam Tb from a left portion thereof (may also be called "left partial pupil area" or simply "left pupil area"). Here, in the figure, a +X direction side refers to the right side, and a −X direction side refers to the left side.

Of the pair of AF pixels 11*a* and 11*b*, the AF pixel 11*a* (may also hereunder be referred to as the "first AF pixel") includes a micro-lens ML, a first light-shielding plate AS1 (may also be called the "first light-shielding film"), a second light-shielding plate AS2 (may also be called the "second light-shielding film"), and a photoelectric converting section PD (may also be called the "photodetector" or the "photodiode"). The micro-lens ML converges light incident upon the first AF pixel 11*a*. The first light-shielding plate AS1 has a slit-like (rectangular) first opening OP1. The second light-shielding plate AS2 is disposed below the first light-shielding plate AS1 and has a slit-like (rectangular) second opening OP2.

The first opening OP1 of the first AF pixel 11*a* is provided at a position that is disposed towards a particular direction (here, rightward (+X direction)) from a center line CL, which is parallel to the light axis LT and passes through the center of the photodetector PD, as a reference (origin). The second opening OP2 of the first AF pixel 11*a* is provided at a position that is disposed towards a direction (may also be referred to as the "opposite direction") that is opposite to the particular direction with the center axis CL as a reference.

Of the pair of AF pixels 11*a* and 11*b*, the other AF pixel 11*b* (may also hereunder be called the "second AF pixel") includes a first light-shielding plate AS1, and a second light-shielding plate AS2. The first light-shielding plate AS1 has a slit-like first opening OP1. The second light-shielding plate AS2 is disposed below the first light-shielding plate AS1 and has a slit-like second opening OP2.

The first opening OP1 of the second AF pixel 11*b* is provided at a position that is disposed towards the direction (may also be referred to as the "opposite direction") that is opposite to the particular direction with the center axis CL as a reference. The second opening OP2 of the second AF pixel 11*b* is provided at a position that is disposed towards the particular direction with the center axis CL as a reference.

That is, in the pair of AF pixels 11*a* and 11*b*, the first openings OP1 are provided so as to be disposed in opposite directions. The second openings OP2 are disposed so as to be displaced in different directions with respect to their respective first openings OP1 in the AF pixels 11*a* and 11*b*.

In the pair of AF pixels 11*a* and 11*b* having the above-described structure, distance-measurement signals of object light transmitted through the different areas (portions) of the exit pupil EY are obtained. More specifically, the light beam Ta transmitted through the right pupil area Qa of the exit pupil EY passes through the micro-lens ML and the first opening OP1 of the first light-shielding plate AS1, and is restricted (limited) by the second light-shielding plate AS2, after which the light beam Ta is received by the photodetector PD of the first AF pixel 11*a*. Then, from the first AF pixel 11*a*, the distance-measurement signal regarding the light beam Ta of the right pupil area Qa is obtained. The light beam Tb transmitted through the left pupil area Qb of the exit pupil EY passes through the micro-lens ML and the first opening OP1 of the second light-shielding plate AS2, and is restricted by the second light-shielding plate AS2, after which the light beam Tb is received by the photodetector PD of the second AF pixel 11*b*. Then, from the second AF pixel 11*b*, the distance-measurement signal regarding the light beam Tb of the left pupil area Qb is obtained.

In the photodetectors PD of the pair of respective AF pixels 11*a* and 11*b*, the light beams Ta and Tb of the object light transmitted through the right portion Qa and the left portion Qb (pair of partial pupil areas) of the exit pupil EY of the taking optical system are received, to generate the distance-measurement signals according to the received light beams Ta and Tb by the respective photodetectors PD.

In each of the pair of AF pixels 11*a* and 11*b*, the two light-shielding plates AS1 and AS2 are used to adjust the object light (may also be called "reception light") that is received by the corresponding photodetector PD, so that the size (range) of the pupil area through which the reception light has passed is adjusted. The details will be discussed below. Since the reception light can be expressed as the object light that arrives at the photodetectors PD, it is also called "arrival light."

Here, although the light-shielding plates AS1 and AS2 are described as including the openings OP1 and OP2, respectively, the light-shielding plates AS1 and AS2 may have light-transmission areas, formed of a material having light transmittance, instead of the openings OP1 and OP2. The openings OP1 and OP2 and the light-transmission areas all pass light, so that they may also be called light-passage areas.

Figure 9:
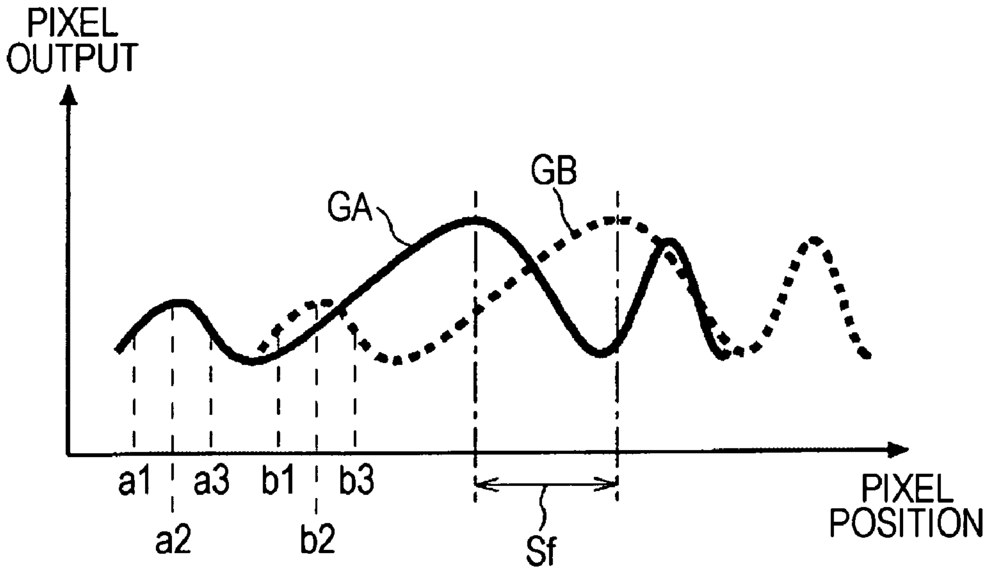
FIG. 9 shows pixel outputs of an AF line.
Figure 10:
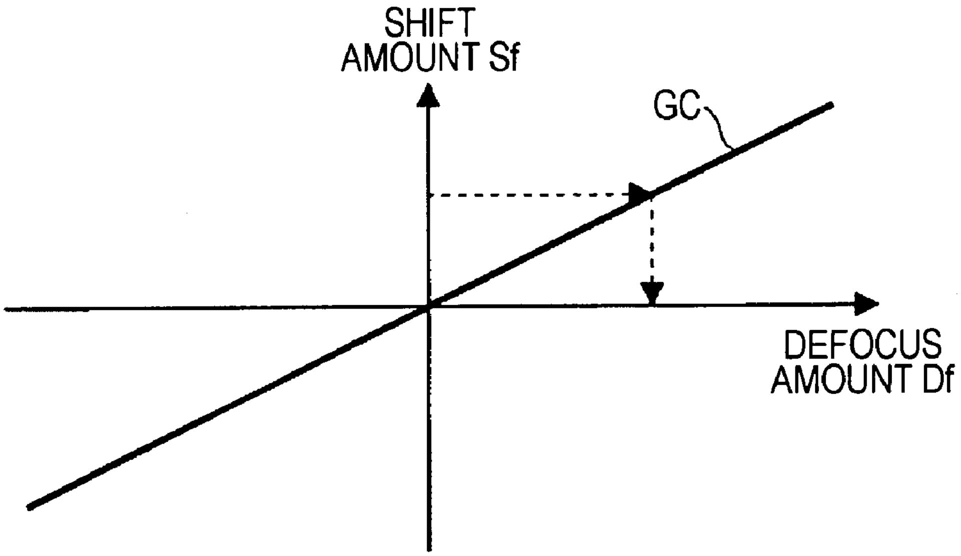
FIG. 10 shows a defocus amount and a shift amount of the pixel outputs.

In the description below, a pixel output of the first AF pixel 11*a* is called an "A-series pixel output, and a pixel output of the second AF pixel 11*b* is called a "B-series pixel output." For example, the relationship between an A-series pixel output AX and a B-series pixel output BX, obtained from a pixel arrangement of AF pixels 11*f* disposed in one AF line Lf1 in FIG. 7, will be described. FIG. 9 shows the pixel outputs of the AF line Lf1. FIG. 10 shows a shift amount Sf of the pixel outputs and a displacement amount (defocus amount) Df from a focus.

At the AF line Lf1, the light beam Ta transmitted through the right pupil area Qa of the exit pupil EY is received by the first AF pixel 11*a*, and the light beam Tb transmitted through the left pupil area Qb of the exit pupil EY is received by the second AF pixel 11*b*. In this case, the A-series pixel output AX at the AF line Lf1 including A-series pixels a1 to a3 is, for example, as shown by a graph GA (illustrated by a solid line) in FIG. 9. The B-series pixel output BX at the AF line Lf1 including B-series pixels b1 to b3 is, for example, as shown by a graph GB (illustrated by a broken line) in FIG. 9.

When the graphs GA and GB shown in FIG. 9 are compared with each other, it can be seen that the A-series pixel output AX and the B-series pixel output BX are such that a phase difference by the displacement amount (shift amount) Sf occurs in the direction of the AF line Lf1 (that is, in the direction in which the AF pixels 11*f* are alternately arranged).

The relationship between the aforementioned shift amount Sf and the displacement amount (defocus amount) Df from a focal plane of the image pickup plane 101*f* in the image pickup device 101 is shown by a linear-function graph GC shown in FIG. 10. The tilt of the graph GC is previously obtained by, for example, tests conducted at a plant, to previously store it in ROM 622 of the overall controlling unit 62 at the time of shipment.

At the phase difference AF calculating circuit 77, on the basis of the output of the AF line Lf of the image pickup device 101, the shift amount Sf is calculated, to obtain the defocus amount Df using the shift amount Sf and the graph GC shown in FIG. 10. Then, a driving amount corresponding to the calculated defocus amount Df is provided to the focus lens 211 through, for example, the overall controlling unit 62 and the lens controlling unit 26, to perform the phase difference AF in which the defocus lens 211 is moved to the in-focus position.

Accordingly, in the image pickup apparatus 1, it is possible to execute a focus detection operation of a phase difference detection method using the pixel outputs from the AF pixels 11*f* built in a light-receiving surface of the image pickup device 101.

<Adjustment of Pupil Areas>

Next, the adjustment of the pupil areas performed in the embodiment will be discussed in detail.

As mentioned above, in each AF pixel 11*f*, using the two light-shielding plates AS1 and AS2, object light (may also be called "reception light") received by the photodetector PD is adjusted, to adjust the size (range) of the pupil area through which the reception light is transmitted. More specifically, in each AF pixel 11*f*, portions of the reception light are shielded (intercepted) by the two light-shielding plates AS1 and AS2, so that the size of the pupil area through which the reception light is transmitted is limited so as to be small. When the size of the pupil area is made small in this way, even if the defocus amount Df is large, it is possible to detect a focus using the pixel outputs of the AF pixels 11*f*.

Figure 11:
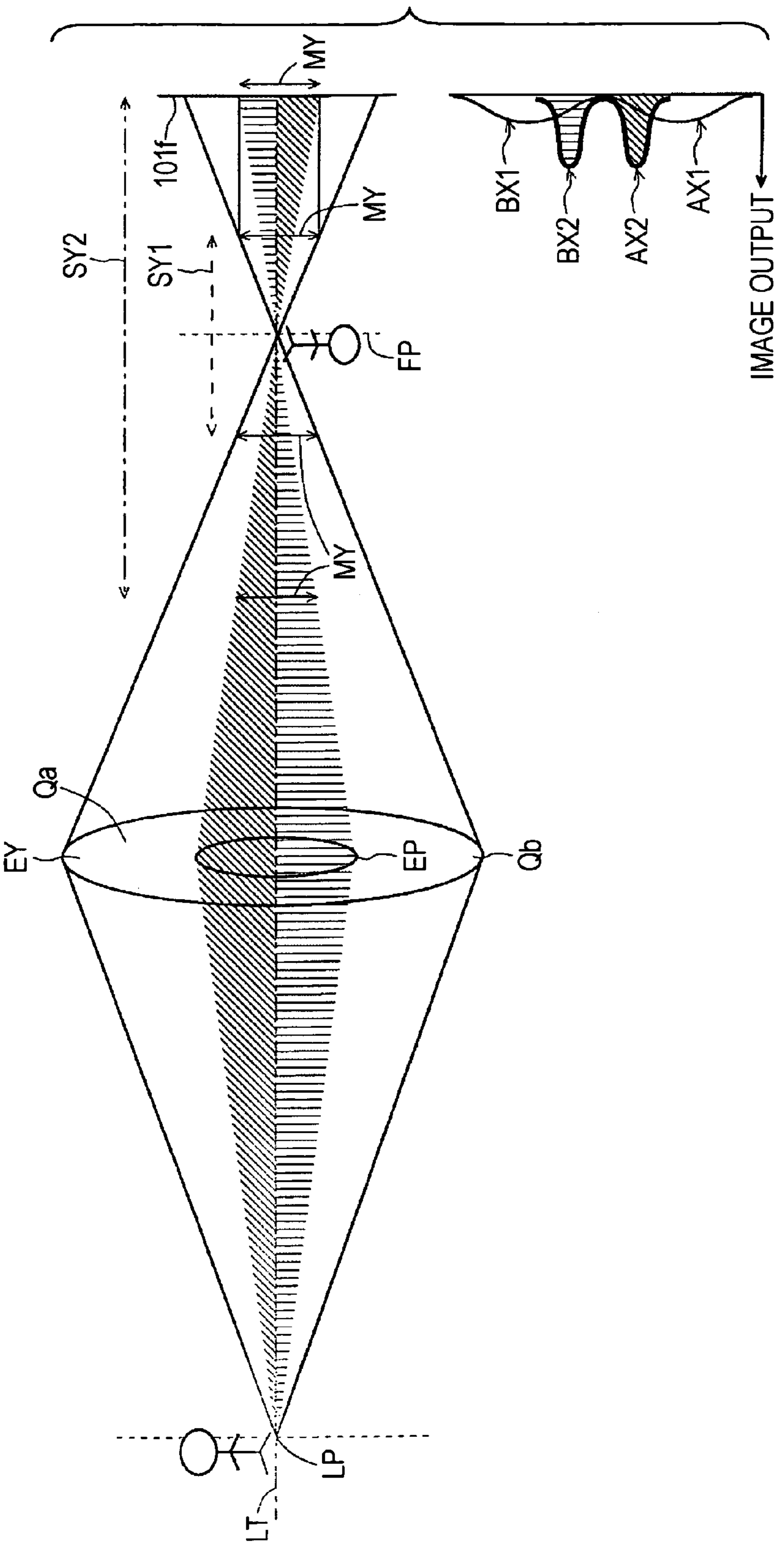
FIG. 11 shows the relationship between an exit pupil and object light beams that reach the image pickup device.
Figure 12:
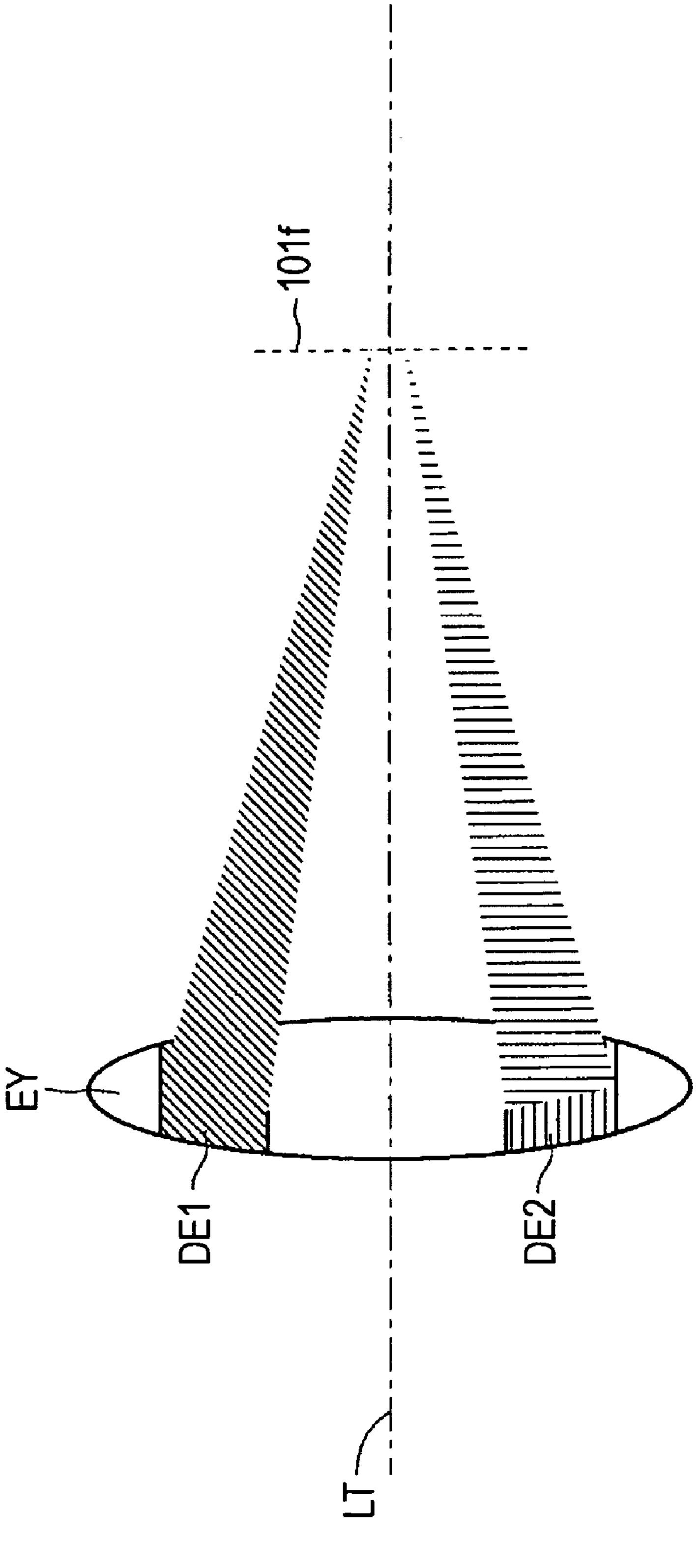
FIG. 12 shows the object light beams which have exited from pupil areas of the exit pupil.
Figure 13:
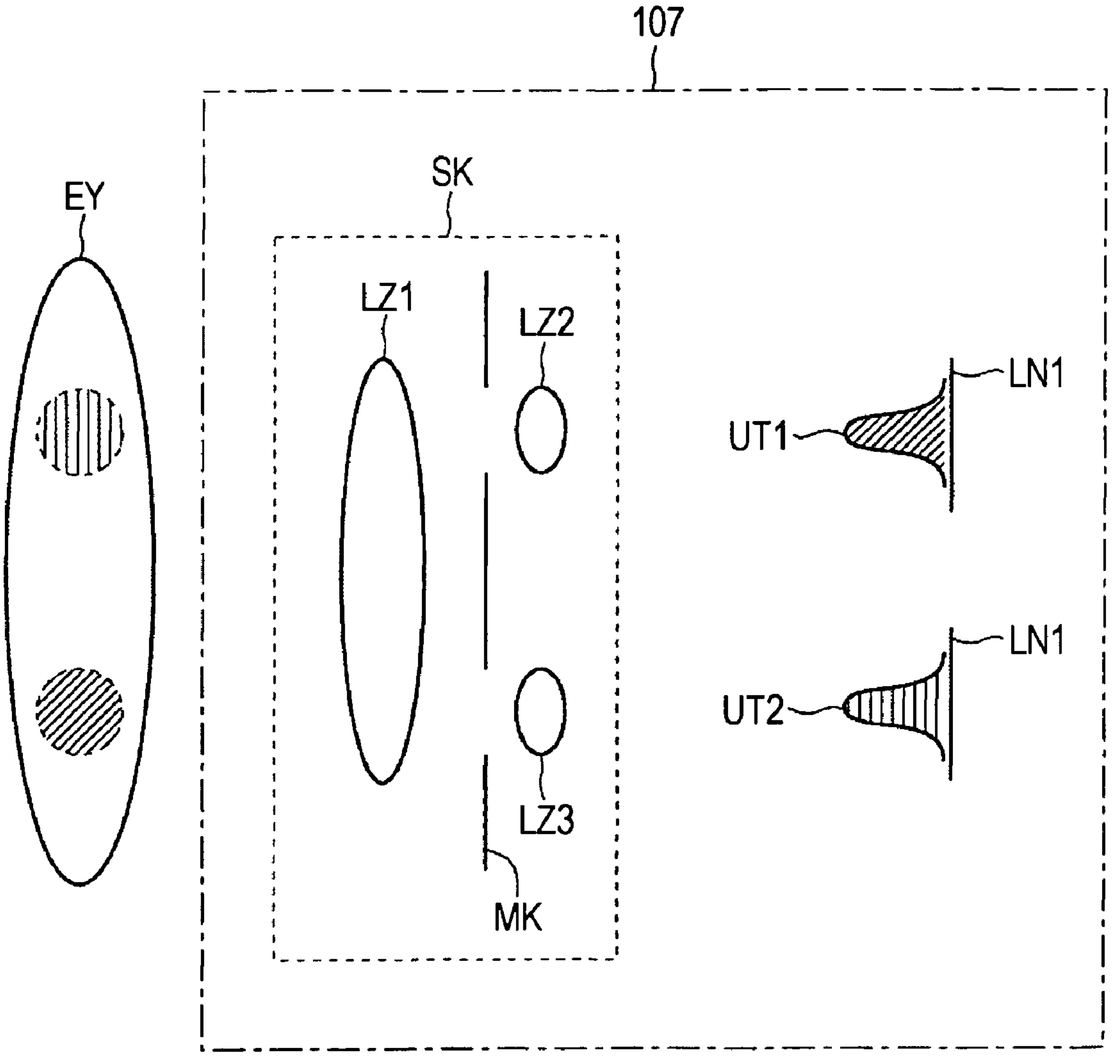
FIG. 13 shows the relationship between the pupil areas and distance-measurement signals obtained by an AF module.

This will be described in more detail with reference to FIGS. 11 and 12. FIG. 11 shows the relationship between the exit pupil EY and the object light beams that reach the image pickup device. FIG. 12 shows the object light which has exited from the pupil areas of the exit pupil EY. FIG. 13 shows the relationship between the pupil areas and distance-measurement signals obtained by the AF module 107. In FIG. 11, for easier comparison with the exit pupil EY, areas (partial areas EP) of the exit pupil EY are shown as having circular shapes.

In FIG. 11, light emitted from a point LP on a light axis LT in a depth of field and incident upon the taking optical system exits from the exit pupil EY and is focused in a focal plane FP. Then, in FIG. 11, a blurred circular image having a certain size is formed near the focal plane FP. The larger this circle (also called "circle of confusion"), the more blurred the image becomes. An image pickup plane 101*f* in FIG. 11 includes an A-series AF pixel 22A and a B-series AF pixel 22B. The AF pixel 22A can receive a light beam transmitted through a right pupil area Qa when viewed from the image pickup plane 101*f* towards the exit pupil EY. The AF pixel 22B can receive a light beam transmitted through a left pupil area Qb when viewed from the image pickup plane 101*f* towards the exit pupil EY. The A-series AF pixel 22A and the B-series AF pixel 22B, disposed in the image pickup plane 101*f*, are not capable of adjusting the sizes of the pupil areas through which the reception light beams have been transmitted.

As described above, in detecting a focus using the AF pixels 11*f* incorporated in the image pickup device 101, the A-series pixel output AX and the B-series pixel output BX are compared with each other to calculate the shift amount Sf of the pixel outputs, so that the defocus amount Df is obtained. However, when the blur (degree of blur) of an image in the image pickup plane (image plane) 101*f* becomes large, it becomes difficult to calculate the shift amount Sf by comparing the pixel outputs with each other.

For example, an image-blur range in which pixel outputs capable of being used as distance-measurement signals can be obtained is called a distance-measurement focus depth SD, and a maximum allowable blur MB in the distance-measurement focus depth SD occurring near the focal plane FP is an amount represented by a solid double-headed arrow MY shown in FIG. 11. In this case, the distance-measurement focus depth SD regarding the light beams transmitted over the entire area of the exit pupil EY corresponds to a range represented by a broken-line double-headed arrow SY1. In FIG. 11, since the image pickup plane 101*f* exists outside the distance-measurement focus depth SD (that is, is not included in the distance-measurement focus depth SD), a blurred image whose degree of blur is greater than the maximum allowable blur MB (may also be called the "highly blurred image" or the "unallowable blurred image") is formed in the image pickup plane 101*f*.

At this time, the AF pixels 22A and 22B existing in the image pickup plane 101*f* cause distance-measurement signals based on the highly blurred image to be generated.

More specifically, from the first AF pixel 22A, the A-series pixel output AX1 (see FIG. 11) regarding the light beam transmitted through the right pupil area Qa is obtained. Since the A-series pixel output AX1 is an output based on the highly blurred image, the difference between pixel outputs of first AF pixels 22A becomes small, so that A-series pixel outputs AX1 become relatively uniform.

Similarly, from the second AF pixel 22B, the B-series pixel output BX1 (see FIG. 11) regarding the light beam transmitted through the left pupil area Qb is obtained. Since the B-series pixel output BX1 is an output based on the highly blurred image, the difference between pixel outputs of second AF pixels 22B becomes small, so that B-series pixel outputs BX1 become relatively uniform.

In this way, when the degree of blur of the image formed in the image pickup plane 101*f* becomes large, the contrasts of the pixel outputs AX1 and BX1 of the respective AF pixels 22A and 22B become small. When the degree of blur exceeds the maximum allowable blur MB, it becomes difficult to specify pixel outputs corresponding to the A-series pixel output AX1 and the B-series pixel output BX1, thereby not allowing calculation of the shift amount Sf.

Here, for example, it is assumed that the sizes of the pupil areas are smaller than the size of the entire area of the exit pupil, and that the light beams transmitted through the partial areas EP of the exit pupil EY reach the image pickup plane 101*f*. In this case, a distance-measurement focus depth SD regarding the light beams transmitted through the partial areas EP falls in a range represented by an alternate-long and -short-line double-headed arrow SY2 (FIG. 11), and is deeper (larger) than the distance-measurement focus depth SD regarding the light beams transmitted over the entire area of the exit pupil EY.

Accordingly, similarly to the principle that the depth of focus is increased when the aperture is made smaller (aperture value is increased), when the sizes of the pupil areas, which have transmitted the arrival light, which arrives at the image pickup plane 101*f*, are reduced, the distance-measurement focus depth SD is increased.

In FIG. 11, since the image pickup plane 101*f* exists in the distance-measurement focus depth SD represented by the alternate-long-and-short-dash-line double-headed arrow SY2, a blurred image whose degree of blur is less than the maximum allowable blur MB (may also be called the "allowable blurred image") is formed in the image pickup plane 101*f*.

At this time, the AF pixels 22A and 22B existing in the image pickup plane 101*f* cause distance-measurement signals based on the allowable blurred image to be generated.

More specifically, from the first AF pixel 22A, the A-series pixel output AX2 (see FIG. 11) regarding the light beam transmitted through the right pupil area Qa (the light beam represented by slanted hatching) is obtained. Since the A-series pixel output AX2 is an output based on the allowable blurred image, the difference between pixel outputs of first AF pixels 22A becomes small.

Similarly, from the second AF pixel 22B, the B-series pixel output BX2 regarding the light beam transmitted through the left pupil area Qb (the light beam represented by hatching using vertical lines) is obtained. Since the B-series pixel output BX2 is also an output based on the allowable blurred image, the difference between pixel outputs of second AF pixels 22A becomes small.

Accordingly, when the degree of blur of the image formed in the image pickup plane 101*f* becomes small (is reduced), the contrasts of the pixel outputs AX2 and BX2 of the respective AF pixels 22A and 22B become large. When the degree of blur is less than the maximum allowable blur MB, it becomes possible to calculate the shift amount Sf of the pixel outputs by comparing the A-series pixel output AX2 and the B-series pixel output BX2 with each other.

In the image pickup apparatus 1 according to the embodiment, as shown in FIG. 12, the sizes of the pupil areas are small, and object light which has exited from small pupil areas (may also be called "restricted pupil areas") DE1 and DE2 is received by the photodetectors PD of the AF pixels 11*f* in the image pickup plane 101*f*. According to this, since the distance-measurement focus depth SD becomes large, when the image formed in the image pickup plane of the image pickup device 101 is considerably blurred, that is, even when the defocus amount Df is large, the focus can be effectively detected using the AF pixels 11*f* incorporated in the image pickup device 101, so that the feasibility of detecting the focus using the AF pixels 11*f* can be increased.

As shown in FIG. 13, in the AF module 107, outputs UT1 and UT2 from a pair of line sensors LN1 and LN2 are compared with each other to generate phase difference detection signals. Object light guided to the line sensors LN1 and LN2 is restricted at a dedicated optical system SK in the AF module 107. More specifically, the AF module 107 includes the dedicated optical system SK including a plurality of lenses LZ1 to LZ3 and a light-shielding mask MK. Light beams from the exit pupil EY are restricted in the dedicated optical system SK, and are guided to the line sensors LN1 and LN2. By this, at the line sensors LN1 and LN2, object light beams that have exited from small pupil areas are received. Even if the defocus amount Df is relatively large, it is possible to generate the phase difference detection signals.

The AF pixels 11*f* incorporated in the image pickup device 101 are not provided with the dedicated optical system SK that restricts the pupil areas. Therefore, as mentioned below, at the AF pixels 11*f*, the sizes of the pupil areas, which cause arrival light, which arrives at the photodetectors PD of the AF pixels 11*f*, to exit therefrom, are restricted by a method differing from that for the AF module 107.

<Method of Adjusting Pupil Area>

Figure 14:
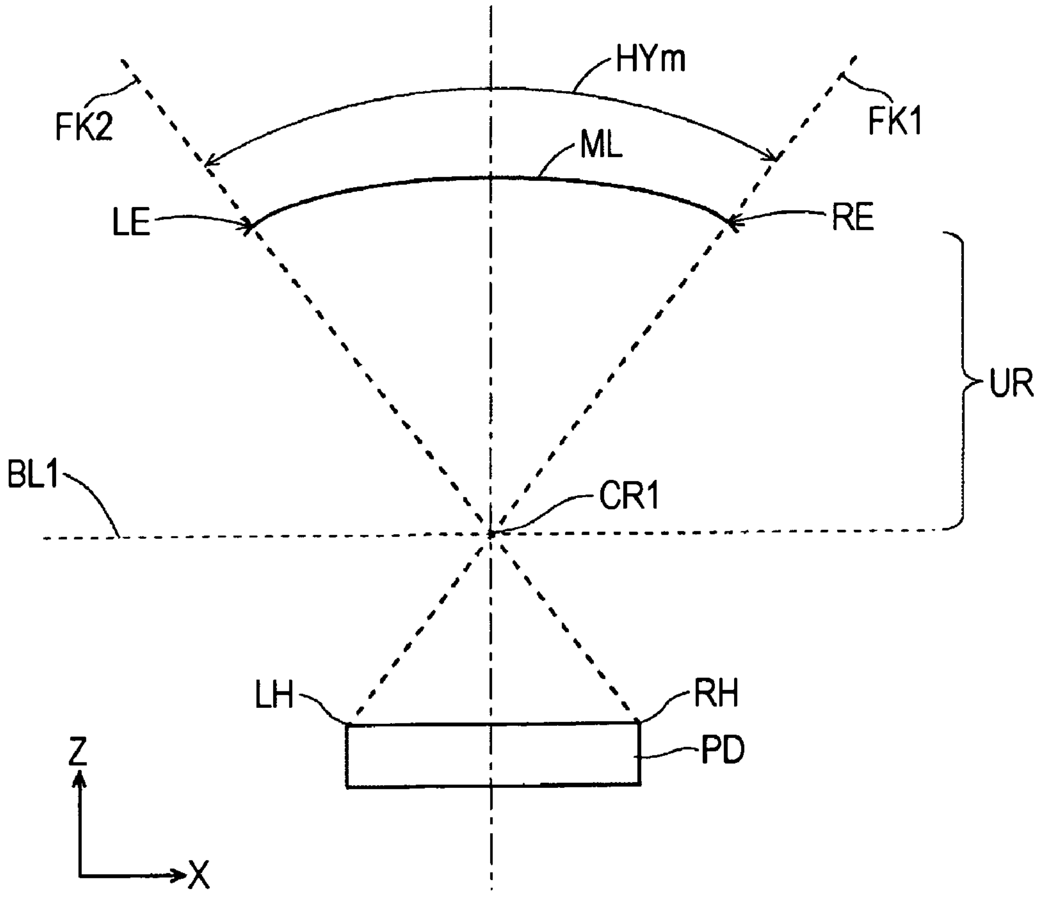
FIG. 14 shows a maximum light reception range of object light, provided by a photodetector.
Figure 15:
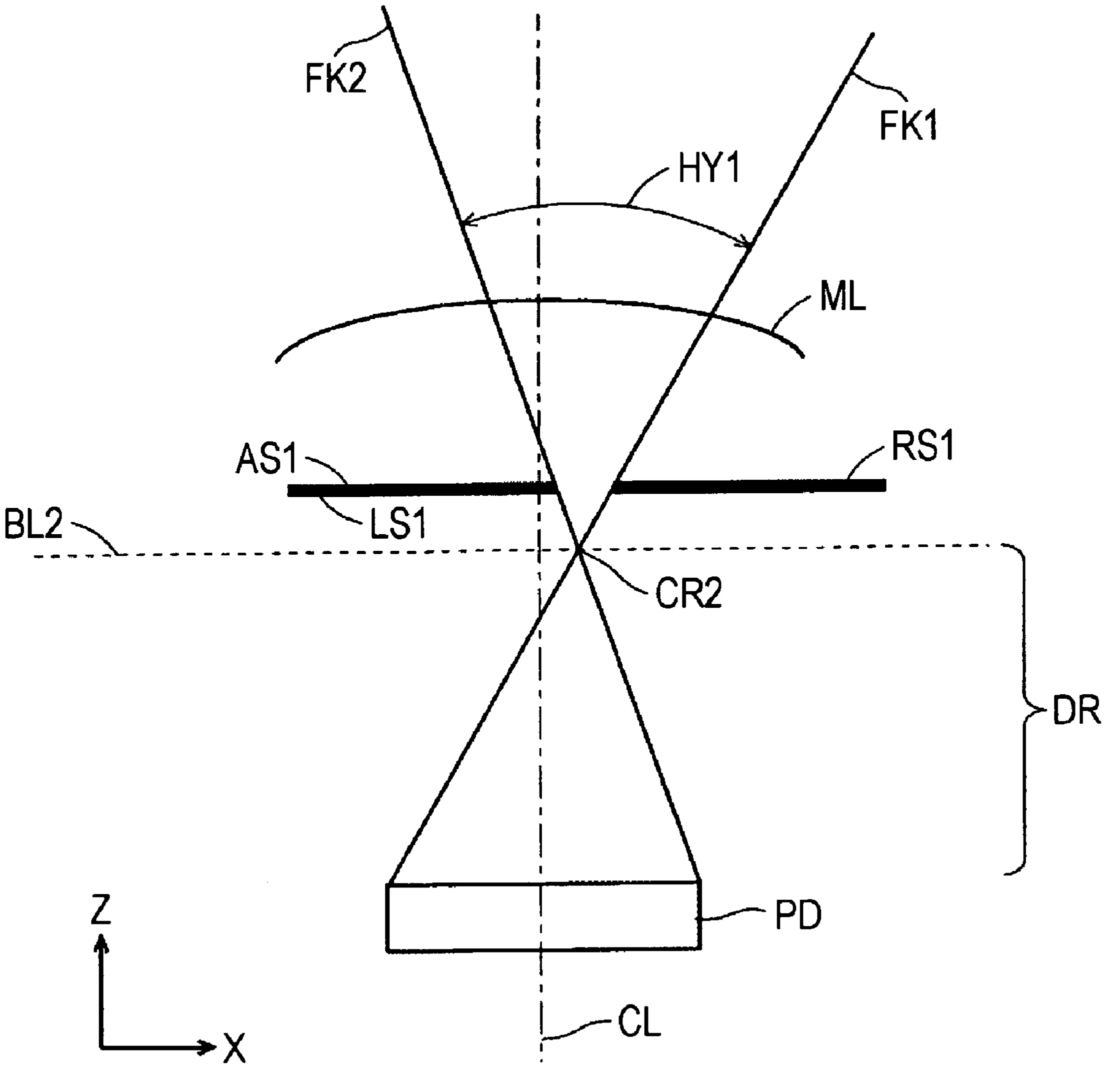
FIG. 15 shows a light reception range of object light, provided by the photodetector, when a first light-shielding plate is provided.
Figure 16:
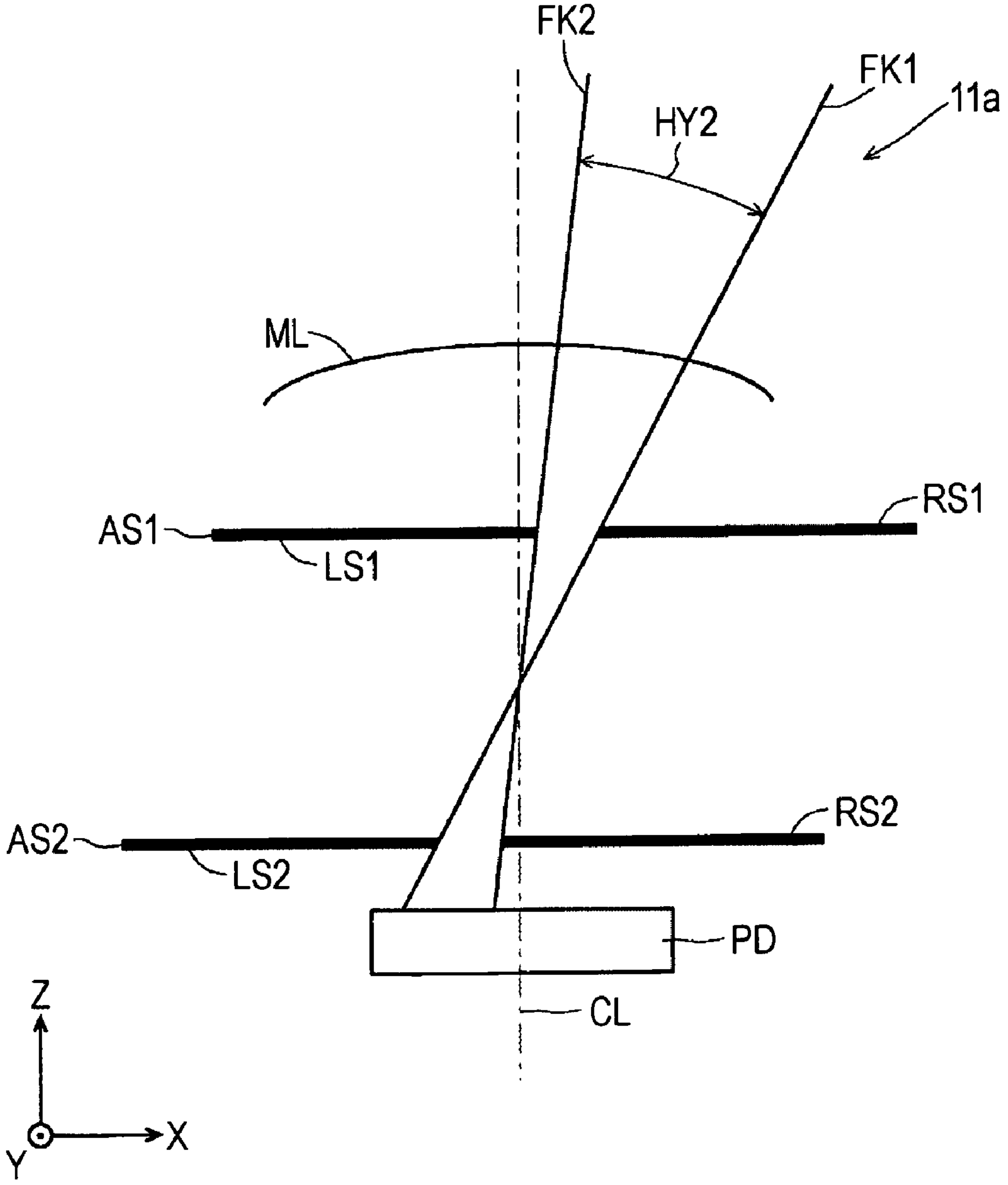
FIG. 16 shows a light reception range of object light, provided by the photodetector of a first AF pixel.

Next, a method of adjusting a pupil area in the present embodiment will be described. FIG. 14 shows a maximum light reception range GRm of object light, provided by a photodetector PD. FIG. 15 shows a light reception range GR of object light, provided by the photodetector PD, when a first light-shielding plate AS1 is provided. FIG. 16 shows a light reception range GR, provided by the photodetector PD of a first AF pixel 11*a*.

Here, for simplification, the method will be described on the basis of a two-dimensional positional relationship in a vertical cross section of the AF pixel 11*f*, and refraction of light at a micro-lens ML is not considered.

In the image pickup apparatus 1 according to the embodiment, using two light-shielding plates AS1 and AS2 in the AF pixel 11*f*, portions of the object light incident upon the AF pixel 11*f* are intercepted, to restrict the size of the pupil area to a small size. That is, in the embodiment, the two light-shielding plates AS1 and AS2 function as a pupil area restricting unit that restricts the size of the pupil area, which has caused arrival light, which arrives at the photodetector, to exit therefrom. Here, the pupil area restricting unit restricts the size of the pupil area to a size that is less than half the size of the entire area of the exit pupil.

The positions of arrangement of the two light-shielding plates AS1 and AS2 that restrict the size of the pupil area to a small size will hereunder be described in detail.

First, as shown in FIG. 14, when the light-shielding plates AS1 and AS2 are not provided, the light reception range GR of object light, provided by the photodetector PD, becomes a maximum, and becomes a range indicated by a double-headed arrow HYm (the maximum reception range GR will hereunder be referred to as the "maximum reception range GRm"). More specifically, the maximum light reception range GRm is a range defined by a straight line FK1 (may also be called the "first prescribed line") and a straight line FK2 (may also be called the "second prescribed line"). The straight line FK1 passes through a right edge RE of the micro-lens ML and a left end LH of the photodiode PD. The straight line FK2 passes through a left edge LE of the micro-lens ML and a right end RH of the photodiode PD.

Here, for reducing the maximum light reception range GRm, at the AF pixel 11*f* (here, the first AF pixel 11*a*), the first light-shielding plate AS1 is disposed at an upper area UR provided at an upper side (+Z-direction side) of a straight line BL1 (may also be called the "first reference straight line"). The straight line BL1 passes through an intersection point CR1 of the two prescribed lines FK1 and FK2, which prescribe the maximum light reception range GRm, and is parallel to a light-reception surface of the photodetector PD.

More specifically, as shown in FIG. 15, the first light-shielding plate AS1 having a first opening OP1 provided so as to be disposed towards the particular direction (+X direction) is disposed at the upper area UR. This reduces the maximum light reception range GRm, so that it becomes a range indicated by a double-headed arrow HY1 in FIG. 15. More specifically, a right-side light-shielding section (right light-shielding section) RS1 of the first light-shielding plate AS1 causes the first prescribed line FK1 to be changed, so that a right area of a pupil area EY corresponding to the maximum light reception range GRm in the exit pupil EY (also called the "corresponding pupil area") is contracted (restricted to a small area). A left-side (−X direction side) light-shielding section (left light-shielding section) LS1 of the first light-shielding plate AS1 causes the second prescribed line FK2 to be changed, so that a left area of the corresponding pupil area in the exit pupil is contracted.

Next, the second light-shielding plate AS2 is disposed at a lower area DR provided at a lower side (−Z direction side) of a second reference straight line BL2. The straight line BL2 passes through an intersection point CR2 of the two prescribed lines FK1 and FK2, which prescribe the light reception range GR restricted by the first light-shielding plate AS1, and is parallel to the light-reception surface of the photodetector PD.

More specifically, as shown in FIG. 16, the second light-shielding plate AS2 having a second opening OP2 provided so as to be disposed towards the opposite (−X direction) is disposed at the lower area DR. This further reduces the light reception range GR, restricted by the first light-shielding plate AS1, so that it becomes a range indicated by a double-headed arrow HY2 in FIG. 16. Even more specifically, a right light-shielding section RS2 of the second light-shielding plate AS2 causes the second prescribed line FK2 to be changed, so that a left-side area of a corresponding pupil area for the light reception range GR is contracted. A left light-shielding section LS2 of the second light-shielding plate AS2 causes the first prescribed line FK1 to be changed, so that a right-side area of the corresponding pupil area is contracted.

Accordingly, at the AF pixel 11*f*, the two light-shielding plates AS1 and AS2 change the prescribed lines FK1 and FK2, to restrict the light reception range GR to a small range. In the foregoing description, although the method of adjusting the pixel area is described taking the first AF pixel 11*a* as an example, even at the second AF pixel 11*b*, the two light-shielding plates AS1 and AS2 cause the prescribed lines FK1 and FK2 to be changed, to reduce the light reception range GR to a small range.

The first prescribed line FK1 is changed by the right light-shielding section RS1 of the first light-shielding plate AS1 and the left light-shielding section LS2 of the second light-shielding plate AS2. Therefore, it can be understood that, for restricting the right-side area of the partial pupil area of object light that is received by the photodetector PD of the AF pixel 11*f*, the right light-shielding section RS1 of the first light-shielding plate AS1 is moved in the −X direction or the left light-shielding section LS2 of the second light-shielding plate AS2 is moved in the +X direction.

Similarly, the second prescribed line FK2 is changed by the left light-shielding section LS1 of the first light-shielding plate AS1 and the right light-shielding section RS2 of the second light-shielding plate AS2. Therefore, it can be understood that, for restricting the left-side area of the partial pupil area, the left light-shielding section LS1 of the first light-shielding plate AS1 is moved in the +X direction or the right light-shielding section RS2 of the second light-shielding plate AS2 is moved in the −X direction.

Accordingly, when the object light incident upon the AF pixel 11*f* is restricted using the two light-shielding plates AS1 and AS2, the partial pupil area, which has caused light, which arrives at the photodetectors PD, to exit therefrom, is restricted to a small area, so that the distance-measurement focus depth SD can be made deep. When blur of an image formed in the image pickup plane 101*f* of the image pickup device 101 is considerable due to increasing the distance-measurement focus depth SD, that is, even if the defocus amount Df is made large, focus detection can be effectively performed using the AF pixel 11*f* incorporated in the image pickup device 101. The case in which the defocus amount Df is increased includes a case in which the focus lens 211 is excessively displaced from an in-focus position prior to detecting a focus. For example, when the bright interchangeable lens 2 having a small f-number (such as 1.4) is mounted, the distance-measurement focus depth SD becomes small, thereby increasing the possibility with which the defocus amount Df becomes large prior to detecting a focus.

At each of the AF pixels 11*a* and 11*b* of a common AF line Lf, the positions of arrangement of the two light-shielding plates AS1 and AS2 are adjusted, and are set so that pixel outputs regarding light beams passing a common pupil area are obtained. For example, in FIG. 12, the first AF pixel 11*a* of the common AF line Lf is set so as to receive object light transmitted through a restricted pupil area DE1, and the second AF pixel 11*b* of the common AF line Lf is set so as to receive object light transmitted through a restricted pupil area DE2.

Modifications

Although embodiments of the invention are discussed above, the present invention is not limited to the above-described content.

Figure 17:
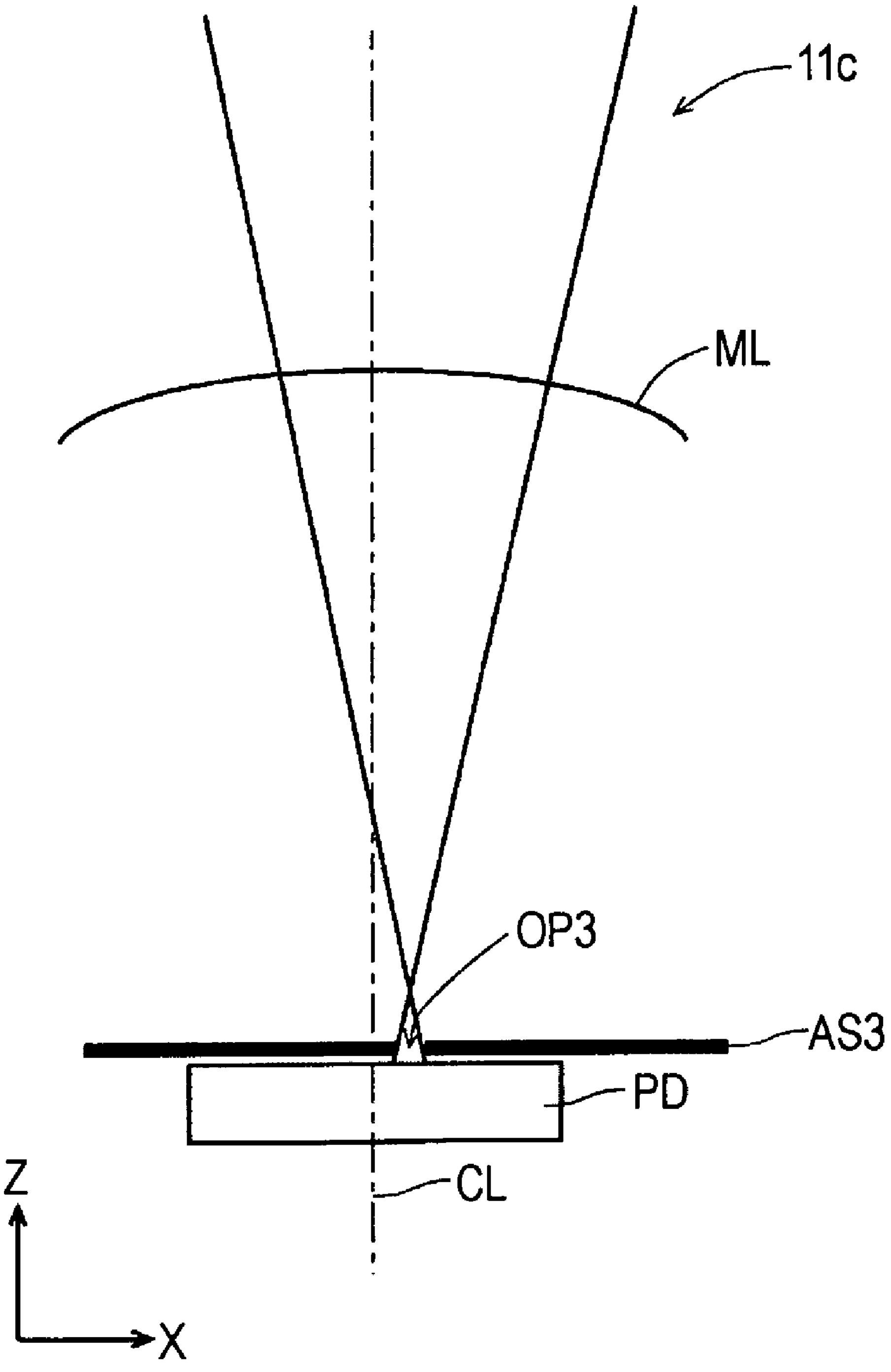
FIG. 17 shows an AF pixel according to a modification.

For example, although in each of the embodiments, the sizes of the partial pupil areas are restricted using the two light-shielding plates AS1 and AS2, the present invention is not limited thereto, so that it is possible to restrict the size of a partial pupil area using one light-shielding plate AS3. FIG. 17 shows an AF pixel 11*c* according to a modification.

More specifically, as shown in FIG. 17, it is possible to dispose the light-shielding plate AS3 having an opening OP3 just in front of a light-receiving surface of a photodiode PD, and restrict a light reception range GR of object light, provided by the photodetector PD.

When restricting the pupil using one light-shielding plate AS3, the opening OP3 of the light-shielding plate AS3 is set so as to be relatively narrow. When the opening OP3 is set so as to be too narrow, the object light no longer reaches the photodetector PD due to diffraction. Therefore, as described in the above-described embodiment, it becomes easier to adjust the pupil areas by combining a plurality of light-shielding plates AS1 than by using one light-shielding plate AS3.

Figure 18:
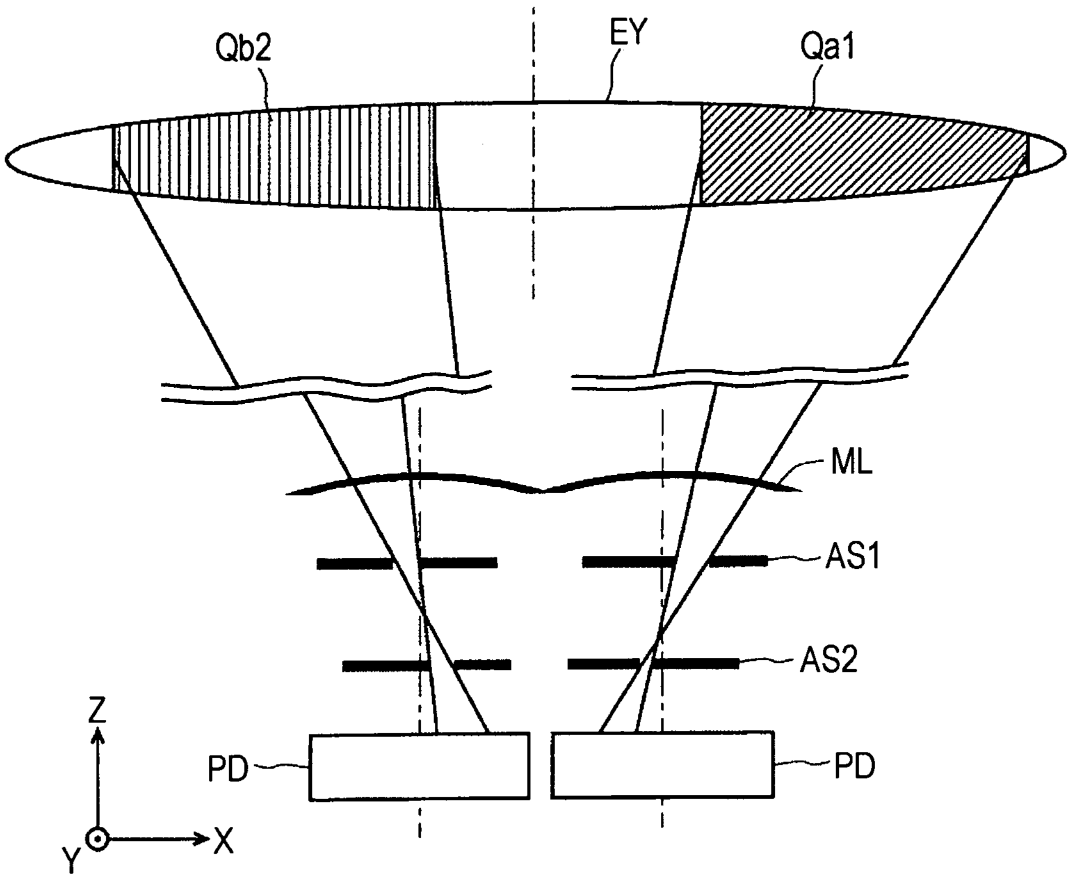
FIG. 18 is a vertical sectional view of a pair of AF pixels according to a modification.

Although, in the above-described embodiment, the light-shielding plates AS1 and AS2 are mirror-symmetrically disposed in each pair of AF pixels 11*a* and 11*b* (see FIG. 8), the present invention is not limited thereto. FIG. 18 is a vertical sectional view of a pair of AF pixels according to a modification.

More specifically, as shown in FIG. 18, if the sizes of pupil areas Qa1 and Qb1 that receive light in the pair of AF pixels 11*a* and 11*b* are set equal to each other, the light-shielding plates AS1 and AS2 need not be mirror-symmetrically disposed in the pair of pixels.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device comprising:

a group of photoelectric conversion cells that output distance-measurement signals for phase difference detection, wherein each photoelectric conversion cell includes a photodetector and pupil restricting means, wherein the photodetector generates the distance-measurement signal, wherein the pupil restricting means restricts a size of a pupil area, from which arrival light has exited, to a predetermined size in an exit pupil of a taking optical system, object light exiting from the exit pupil of the taking optical system, the arrival light arriving at the photodetector, and wherein the predetermined size is less than half a size of an entire area of the exit pupil.

2. The image pickup device according to claim 1, wherein the pupil restricting means includes a first light-shielding layer disposed above the photodetector, and wherein the first light-shielding layer intercepts a portion of the object light from the exit pupil, to restrict the size of the pupil area.

3. The image pickup device according to claim 2, wherein the pupil restricting means further includes a second light-shielding layer disposed between the photodetector and the first light-shielding layer, and wherein the second light-shielding layer cooperates with the first light-shielding layer and intercepts the portion of the object light to restrict the size of the pupil area.

4. The image pickup device according to claim 3, wherein the first light-shielding layer has a first passage area that passes the portion of the object light therethrough, wherein the second light-shielding layer has a second passage area that passes the portion of the object light therethrough, and wherein the first passage area and the second passage area are provided so as to be displaced from each other.

5. The image pickup device according to claim 4, wherein the group of photoelectric conversion cells includes a plurality of pairs of the photoelectric conversion cells, each pair dividing the exit pupil in a first direction and in a second direction, the first and second directions being opposite to each other, and wherein each pair of the photoelectric conversion cells includes a first photoelectric conversion cell and a second photoelectric conversion cell, wherein, in the first photoelectric conversion cell, the first passage area is disposed towards the first direction in the first light-shielding layer, and the second passage area is disposed towards the second direction in the second light-shielding layer, and wherein, in the second photoelectric conversion cell, the first passage area is disposed towards the second direction in the first light-shielding layer, and the second passage area is disposed towards the first direction in the second light-shielding layer.

6. An image pickup apparatus comprising:

an image pickup device including a photoelectric conversion cell that outputs a distance-measurement signal for phase difference detection; and focus detecting means for detecting a focus on the basis of the distance-measurement signal, wherein the photoelectric conversion cell includes a photodetector and pupil restricting means, wherein the photodetector generates the distance-measurement signal, wherein the pupil restricting means restricts a size of a pupil area, from which arrival light has exited, to a predetermined size in an exit pupil of a taking optical system, object light exiting from the exit pupil of the taking optical system, the arrival light arriving at the photodetector, and wherein the predetermined size is less than half a size of an entire area of the exit pupil.

7. An image pickup device comprising:

a group of photoelectric conversion cells that output distance-measurement signals for phase difference detection, wherein each photoelectric conversion cell includes a photodetector and a pupil restricting unit, wherein the photodetector generates the distance-measurement signal, wherein the pupil restricting unit restricts a size of a pupil area, from which arrival light has exited, to a predetermined size in an exit pupil of a taking optical system, object light exiting from the exit pupil of the taking optical system, the arrival light arriving at the photodetector, and wherein the predetermined size is less than half a size of an entire area of the exit pupil.

8. An image pickup apparatus comprising:

an image pickup device including a photoelectric conversion cell that outputs a distance-measurement signal for phase difference detection; and a focus detecting unit that detects a focus on the basis of the distance-measurement signal, wherein the photoelectric conversion cell includes a photodetector and a pupil restricting unit, wherein the photodetector generates the distance-measurement signal, wherein the pupil restricting unit restricts a size of a pupil area, from which arrival light has exited, to a predetermined size in an exit pupil of a taking optical system, object light exiting from the exit pupil of the taking optical system, the arrival light arriving at the photodetector, and wherein the predetermined size is less than half a size of an entire area of the exit pupil.

* * * * *